(12) United States Patent
Nandwana et al.

(10) Patent No.: US 11,720,944 B2
(45) Date of Patent: *Aug. 8, 2023

(54) SYSTEM AND METHOD FOR SECURE COMMUNICATION

(71) Applicant: Optiks Solutions, Inc., Piscataway, NJ (US)

(72) Inventors: Anupam Nandwana, Piscataway, NJ (US); Avirup Basu, Piscataway, NJ (US); Edward Vaz, Piscataway, NJ (US); Rohan Nandwana, Piscataway, NJ (US)

(73) Assignee: Optiks Solutions, Inc., Piscataway, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,703

(22) Filed: Mar. 31, 2022

(65) Prior Publication Data

US 2022/0222721 A1    Jul. 14, 2022

Related U.S. Application Data

(63) Continuation-in-part of application No. 16/893,474, filed on Jun. 5, 2020, now Pat. No. 11,393,005.

(60) Provisional application No. 63/186,997, filed on May 11, 2021, provisional application No. 62/880,613, filed on Jul. 30, 2019.

(51) Int. Cl.
| | | |
|---|---|---|
| *H04L 12/70* | (2013.01) | |
| *H04L 41/0806* | (2022.01) | |
| *H04W 48/08* | (2009.01) | |
| *H04L 67/12* | (2022.01) | |
| *G06Q 30/0601* | (2023.01) | |
| *H04W 4/80* | (2018.01) | |
| *H04L 9/40* | (2022.01) | |
| *H04L 67/1001* | (2022.01) | |

(52) U.S. Cl.
CPC ..... *G06Q 30/0613* (2013.01); *H04L 63/0861* (2013.01); *H04L 67/10015* (2022.05); *H04W 4/80* (2018.02)

(58) Field of Classification Search
CPC ............ G06Q 30/0613; H04L 63/0861; H04L 67/10015; H04L 67/12; H04W 4/80; H04W 4/38
USPC .......................................................... 705/26
See application file for complete search history.

(56) References Cited

U.S. PATENT DOCUMENTS

| | | | | |
|---|---|---|---|---|
| 8,055,508 | B1 * | 11/2011 | Leblang | G06Q 10/08 705/1.1 |
| 11,023,878 | B1 * | 6/2021 | Hernandez | G06Q 20/325 |
| 2014/0250018 | A1 * | 9/2014 | Phillips | G06Q 20/4012 705/72 |
| 2016/0071094 | A1 * | 3/2016 | Krishnaiah | G06Q 20/308 705/66 |
| 2016/0210635 | A1 * | 7/2016 | Alyeshmerni | G06Q 20/36 |

(Continued)

OTHER PUBLICATIONS

Notice of Allowance dated Mar. 23, 2022 for U.S. Appl. No. 16/893,474 (pp. 1-9).

*Primary Examiner* — Joe Chacko
*Assistant Examiner* — Elizabeth Kassa
(74) *Attorney, Agent, or Firm* — Graeser Associates International Inc.; Dvorah Graeser

(57) ABSTRACT

A system and method for securing authenticated communication through a device that is able to trigger an offline physical event through an online communication process.

19 Claims, 28 Drawing Sheets

Firmware Flow for Wi-Fi (w/ RFID) Devices

(56) References Cited

U.S. PATENT DOCUMENTS

2016/0307176 A1* 10/2016 Renke .................. G06Q 20/202
2018/0248804 A1* 8/2018 Nandy ................ H04L 67/1002
2019/0130353 A1* 5/2019 Fenty, III ........... G06Q 30/0635
2020/0313910 A1* 10/2020 Lindemann ........... H04L 63/166

* cited by examiner

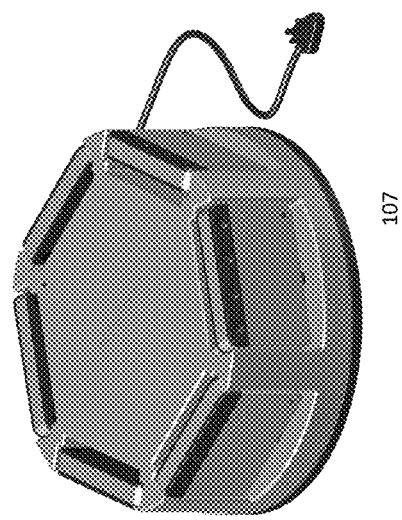
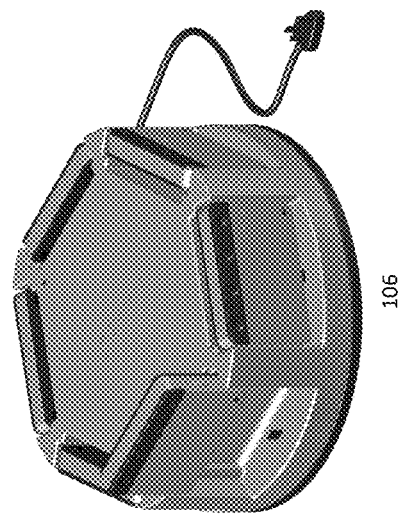
Figure 1B
Device Docking Station

Device internal flow / logic diagram

Data flow from device (Wi-Fi without fingerprint)

Data flow from device (Wi-Fi with fingerprint)

Data flow from device (GSM without fingerprint)

Data flow from device (GSM with fingerprint)

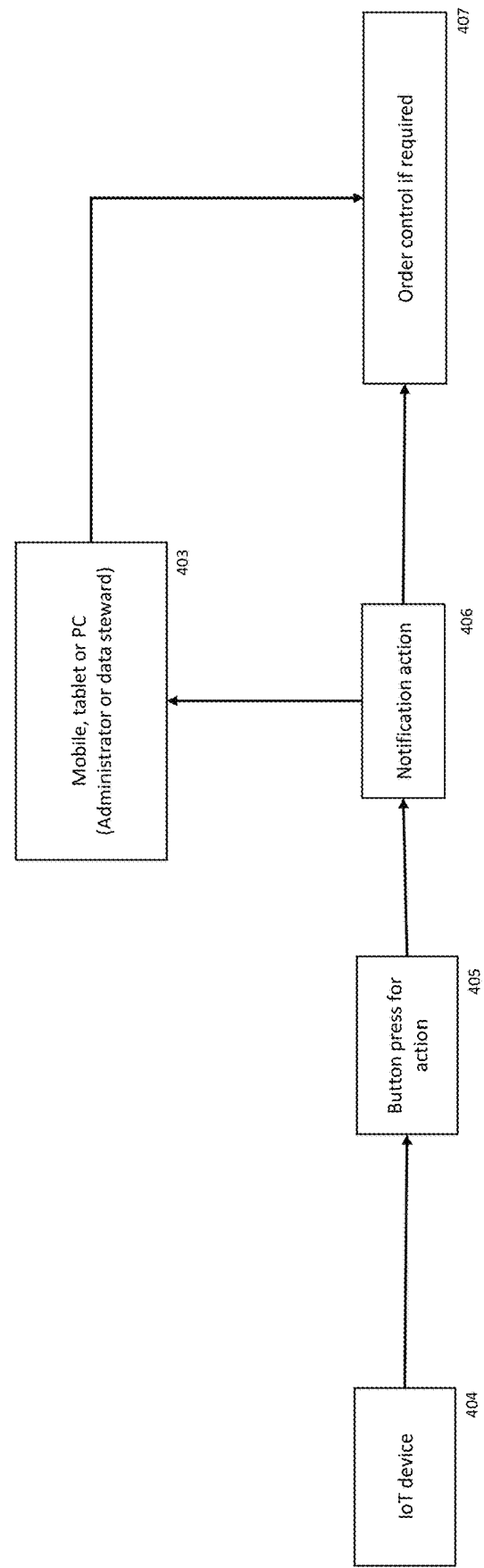
Figure 4A — End-End Flow

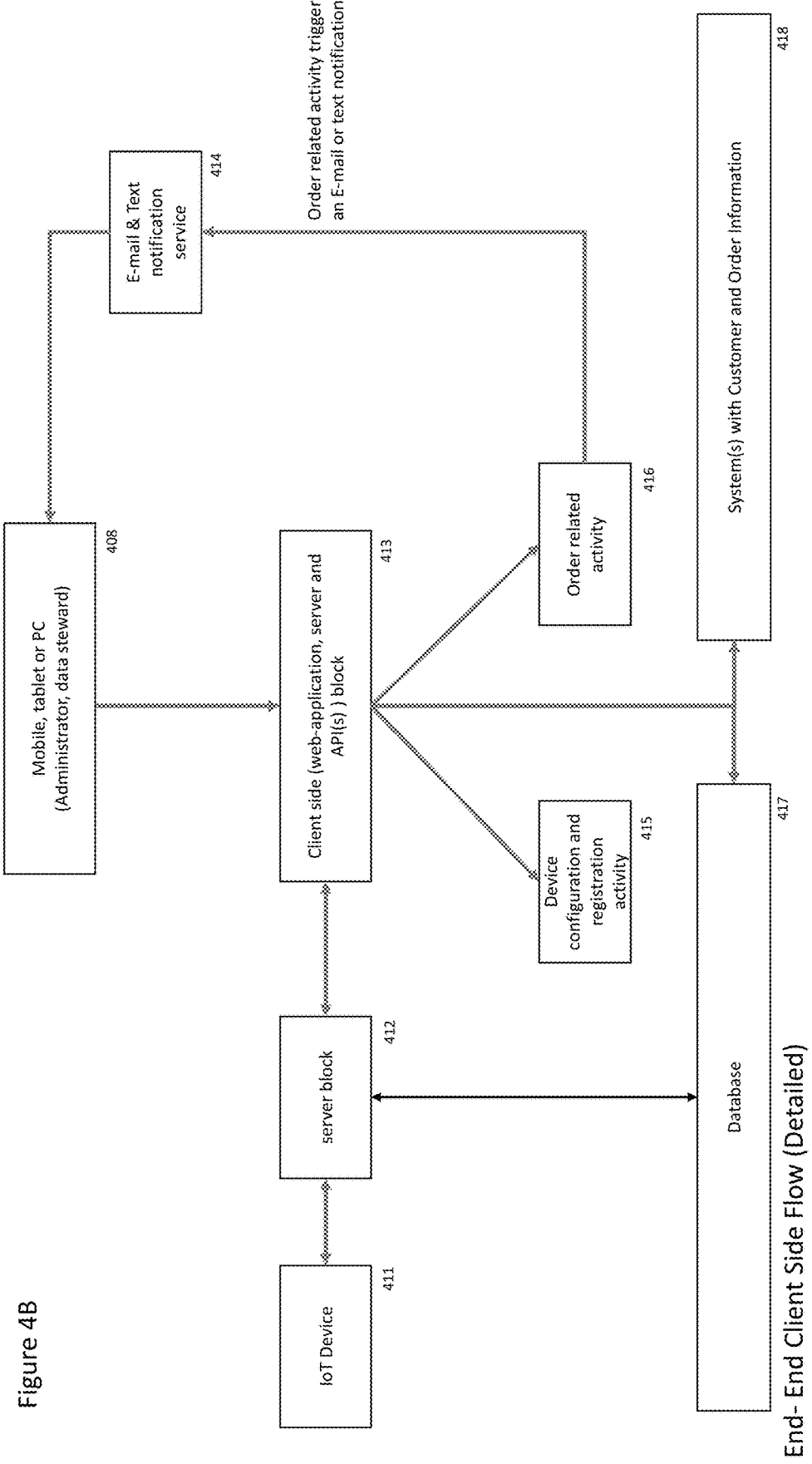

Data flow from device to client server

Server side data flow

Server block: The data from the device is received through the load balancer to trigger a specific MQTT broker which triggers a randomly selected router service based on shared subscription policy configured in the MQTT broker.

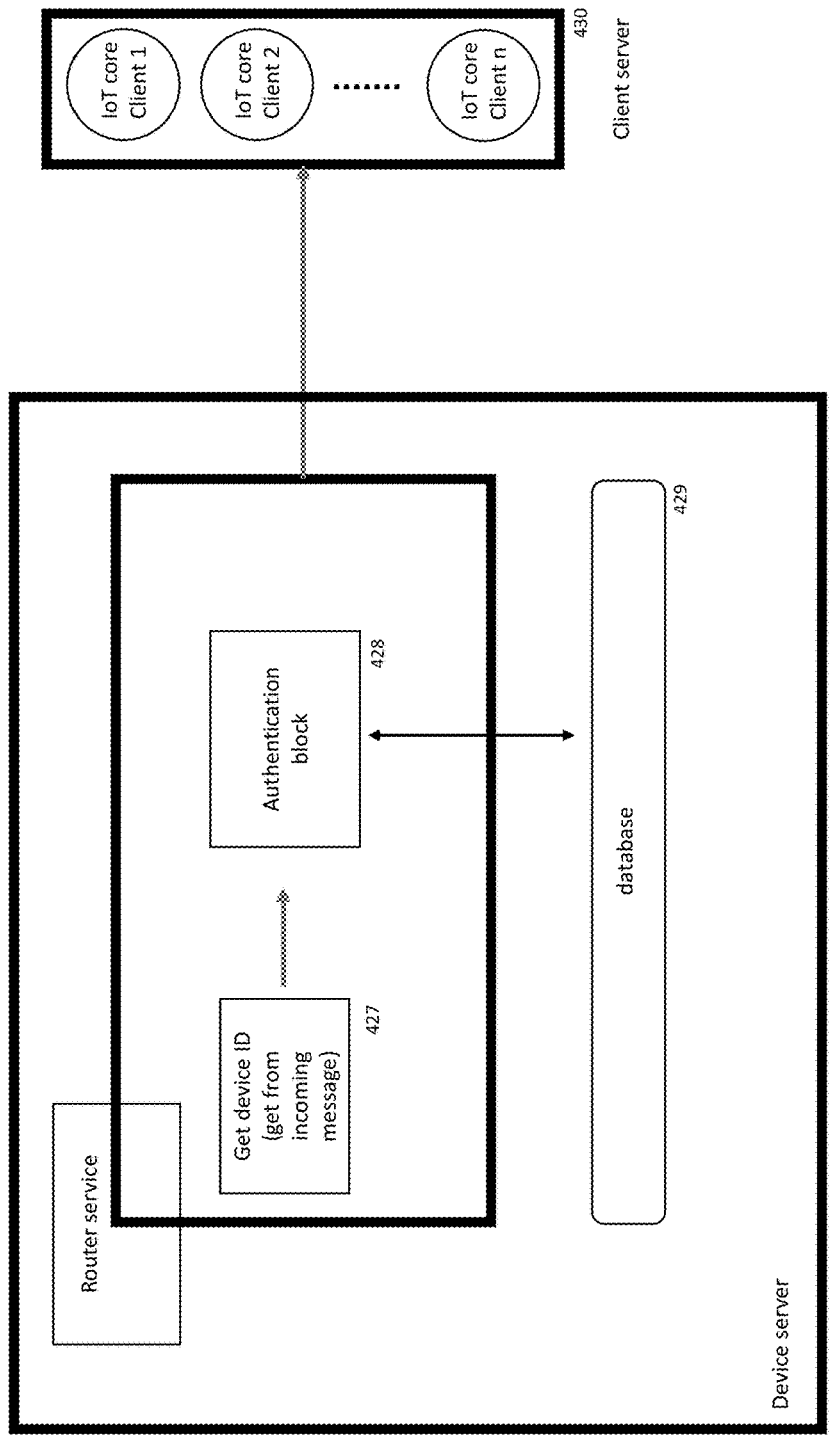

Client server side: Order placement data flow

Client server side: Configuration of device for specific actions

Admin roles

End-user roles

Data-steward roles

Figure 12  Firmware Flow for LTE-M (w/ RFID) Devices

SYSTEM AND METHOD FOR SECURE COMMUNICATION

FIELD OF THE INVENTION

The present invention is of a system and method for secure communication, and in particular, of such a system and method for securing communication through a device that is able to trigger an offline physical event through an online communication process.

BACKGROUND OF THE INVENTION

Currently there is a significant problem for controlling real world events, such as ordering products, through an online environment. On the one hand, organizations such as corporations, hospitals, schools and so forth may wish to provide ease of ordering products for their staff and customers. Requiring multiple layers of permissions and authorizations for ordering such products can result in significant time wastage and effort for the staff and customers. On the other hand, reducing such bureaucratic procedures may result in unauthorized and wasteful orders being placed. Unfortunately, there is no currently available solution which is both able to provide control over offline events through an online system, yet which does not require the navigation of a complicated bureaucratic procedure.

Many industrial processes also require or at least may be supported by such automation. For example, the research laboratories frequently need to order supplies and services. Other processes exist in which automated execution of such a work stream would be quite helpful.

BRIEF SUMMARY OF THE INVENTION

The present invention overcomes the drawbacks of the background art by providing a system and method for securing communication through a device that is able to trigger an offline physical event through an online communication process. The trigger(s) determined by the device are preferably controlled through a separate application, which may be controlled through a user computational device and/or a server. The separate application sets the one or more triggers accessible to the device and also determines one or more' conditions for activating the one or more triggers. Upon detection of one or more conditions by the device, one or more triggers are activated. The user computational device receives a notification of the activation of the trigger. The user computational device may modify the trigger, the activation of the trigger or the one or more downstream actions which occur upon activation of the trigger. Such modification may occur before activation of the trigger or after activation of the trigger.

Upon execution of the trigger, for example by pushing a button on the device, a work stream is preferably executed. For example, such a work stream may comprise ordering a product and/or service upon pushing the button on the device.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions.

Software (e.g., an application, computer instructions) which is configured to perform (or cause to be performed) certain functionality may also be referred to as a "module" for performing that functionality, and also may be referred to a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions—which can be a set of instructions, an application, software—which are operable on a computational device (e.g., a processor) to cause the computational device to conduct and/or achieve one or more specific functionality. Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIGS. 1A-1C provide various non-limiting, exemplary views and flows for operation of an IoT (Internet of things) device for triggering a real world, offline event;

FIGS. 4A-4H relate to various systems and flows for placing an order, incorporating the IoT device as described herein, in non-limiting embodiments;

DESCRIPTION OF AT LEAST SOME EMBODIMENTS

Figure 1A:
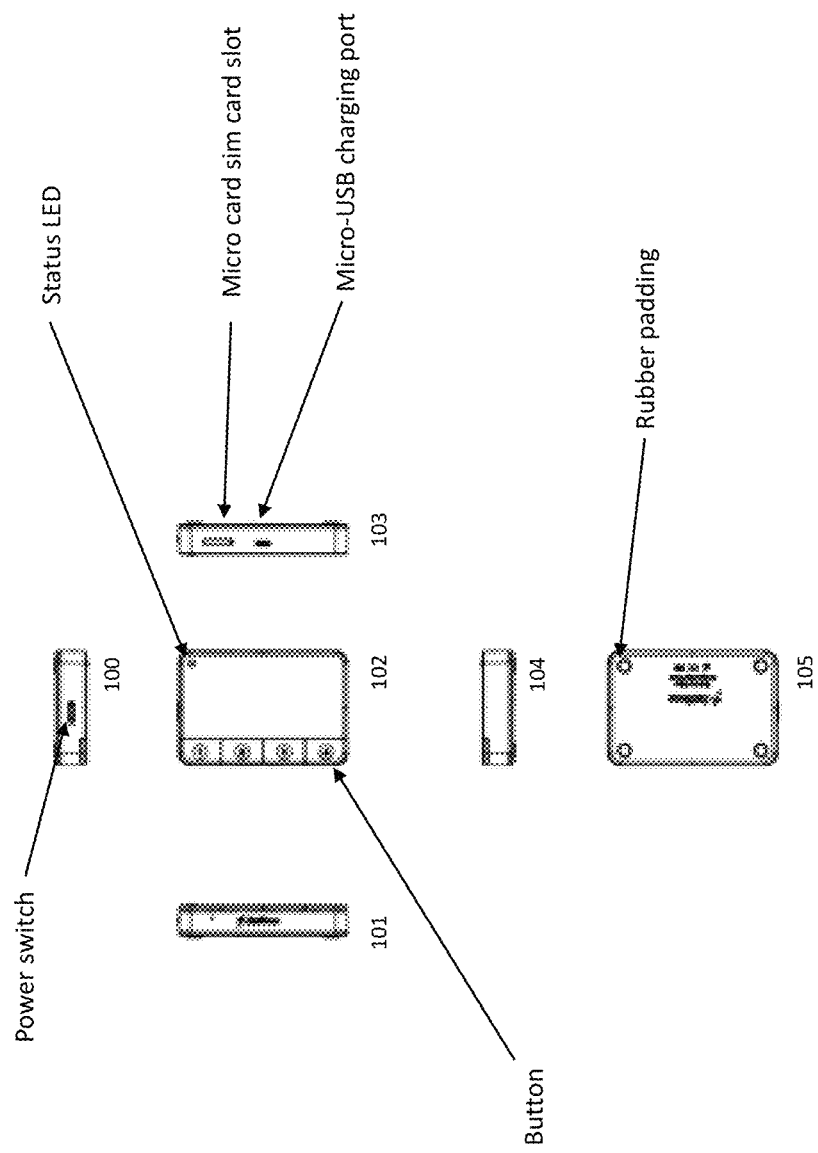

Turning now to the drawings, as shown in FIG. 1A, there is provided a set of views of an internet of things, or IoT, device. As shown in a plurality of views, a device 100, features hardware for authentication that preferably does not require a fingerprint or RFID (radio frequency identification) card authentication. The view at 100 shows a power button. A side view is shown at 101, a front-end view 102, another side view at 103, a view at 104, and a back view at 105. Front-end view 102 includes a plurality of buttons, at least 1 and optionally up to four buttons, as well as an optional LED to indicate status. Optionally device 100, or any IoT device described herein, comprises a sensor in addition to, or in place of, one or more buttons for receiving direct input for determining an action to be triggered. At 103, a slot is shown to permit a cellular connection, for example for a SIM card or a micro-SIM card. The view at 103 also shows a charging port. View at 105 shows exemplary feet or rubber padding.

FIG. 1B shows a non-limiting exemplary device docking station shown in two embodiments, 106 and 107, for permitting the devices to dock and recharge. In view 106, the device is showing coming into the docking station and in 107, the device is showing as fully docked. Optionally, up to six devices 100 are charged in the docking station.

Figure 1C:
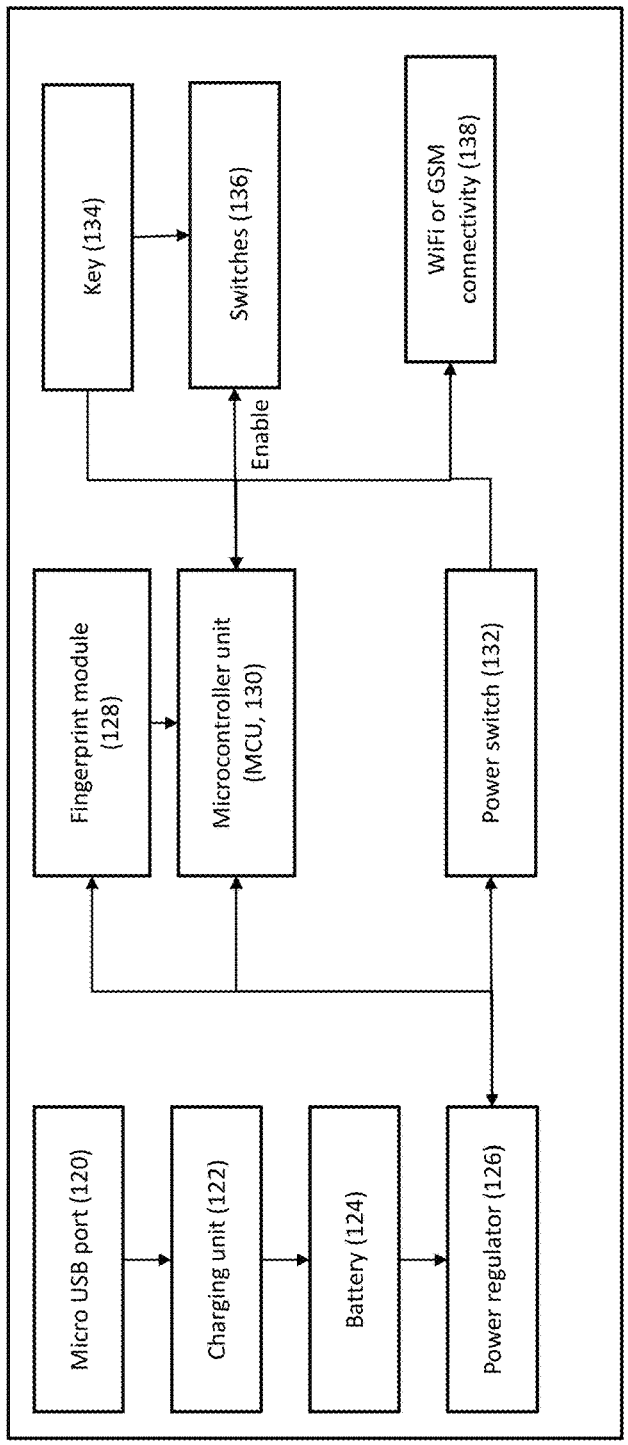

FIG. 1C shows an internal flow for the operation of the device. As shown in device, 100, power is preferably received through a micro-USB port 120 and then flows to charging unit 122. Charging unit 122 then charges a battery 124 as needed. Battery 124 enables device 100 to operate without being connected to the docking station as shown in FIG. 1B, or another source of power, except as needed to maintain a required charge on battery 124.

A power regulator 126 supplies power from battery 124 to an optional fingerprint module 128, for optionally identifying a user of device 100 through a fingerprint. Additionally or alternatively, RFID (radio frequency identification) card authentication may be used. Power regulator 126 also supplies power to a MCU (microcontroller unit, 130), which manages overall functionality of device 100. Device 100 is turned off and on through a power switch 132.

Power switch 132 further controls power to a key 134 and switches 136. The combination of key 134 and switch or switches 136 forms a button as previously described, for being activated by a user through pressing the button, for example. Power switch 132 further controls power to a connectivity module 138, which may for example include cellular or WiFi connectivity as described herein.

Figure 2:
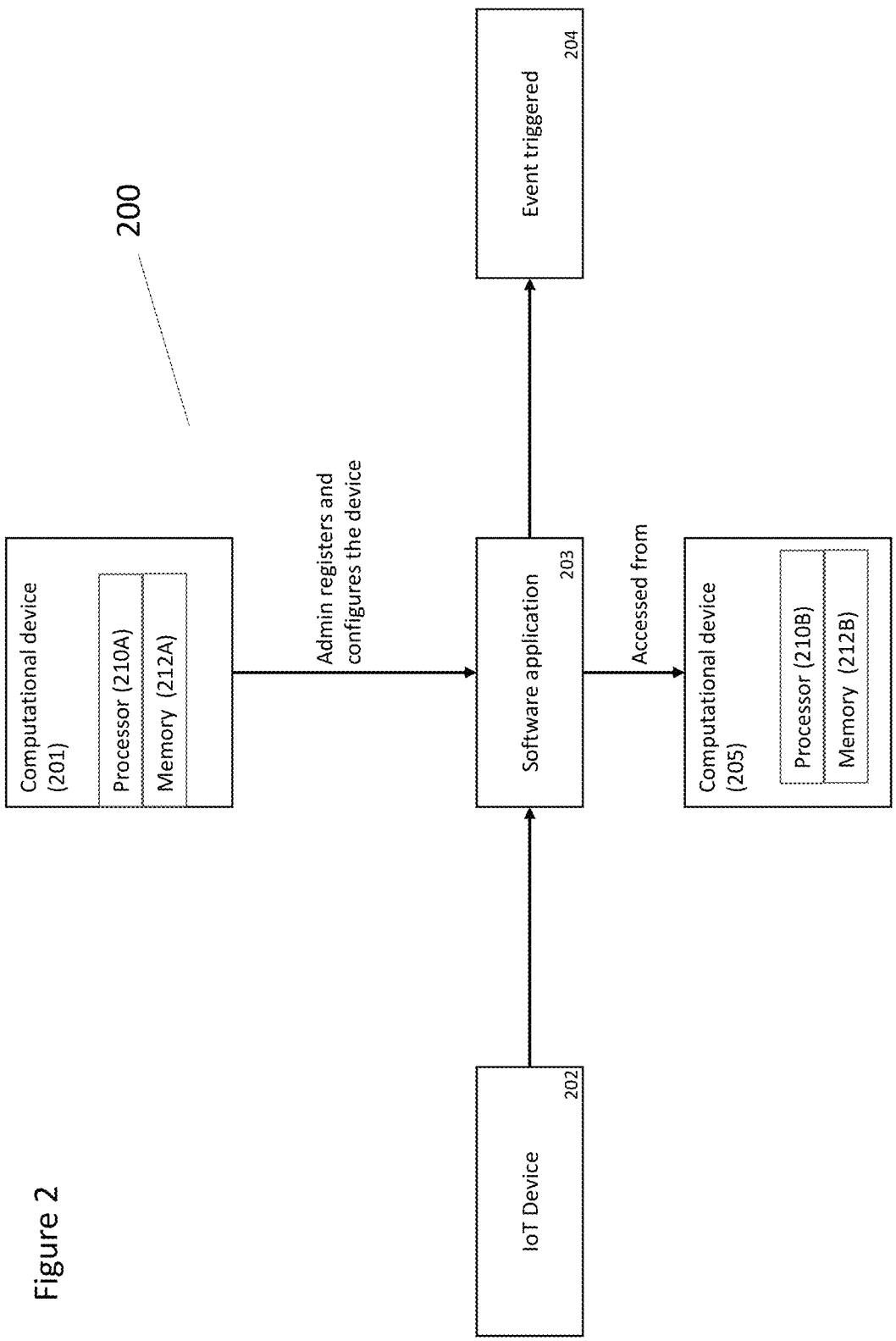
FIG. 2 shows a non-limiting, exemplary flow for a system incorporating the device of FIGS. 1A-1C.

As shown in FIG. 2, a non-limiting exemplary flow for placing an order is shown. An order may include but is not limited to, ordering a product or service to be provided or delivered; or causing any electronic action or set of actions to be performed. In a flow 200, the process for placing an order preferably begins by having a computational device, which may be, for example, mobile, tablet or PC, shown as computational device 201. Computational device 201 may for example be controlled by an authorized user. Computational device 201 comprises a processor 210A and a memory 212A. Each computational device or server as shown throughout the drawings would feature such a processor and memory combination, even if not shown for the sake of clarity.

Computational device 201 also preferably features a user interface (not shown, although it may be implemented through application 203). The user transfers commands through the user interface. Computational device 201 proceeds then to perform necessary actions, through instructions stored in memory 212A and executed by processor 210A.

As used herein, a "user interface" generally includes a plurality of interface devices and/or software that allow a user to input commands and data to direct the processing device to execute instructions. For example, the user interface may include a graphical user interface (GUI) or an interface to input computer-executable instructions that direct the processor to carry out specific functions. The user interface employs certain input and output devices to input data received from a user or output data to a user. These input and output devices may include a display, mouse, keyboard, button, touchpad, touch screen, microphone, speaker, LED, light, joystick, switch, buzzer, bell, and so forth.

As used herein, a processor generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Computational device 201 may be used for registering and then configuring the IoT device 202 through an application 203. Once IoT device 202 has been configured, then the IoT device 202 may be used to place an order or invoke another event 204 through the application 203. Application 203 is optionally also accessed from a separate computational device 205, also shown as featuring a processor 210B and a memory 212B. The order may then be placed through the application 203. Optionally, another event may be performed at 204, once configuration has occurred and the IoT device 202 has been registered to place orders.

For example, optionally memory 212A of computational device 201 features a plurality of instructions, which, when executed by processor 210A, cause the execution of application 203. Preferably, memory 212A is configured for storing a defined native instruction set of codes. Processor 210A is configured to perform a defined set of basic operations in response to receiving a corresponding basic instruction selected from the defined native instruction set of codes stored in memory 212A. For example and without limitation, memory 212A may store a first set of machine codes selected from the native instruction set for registering IoT device 202 through application 203; a second set of machine codes selected from the native instruction set for configuring IoT device 202 according to one or more requirements, wherein such requirements are sent from application 203; and a third set of machine codes selected from the native instruction set for invoking an event by IoT device 202 through application 203.

Preferably, memory 212B is also configured for storing a defined native instruction set of codes. Processor 210B is configured to perform a defined set of basic operations in response to receiving a corresponding basic instruction selected from the defined native instruction set of codes stored in memory 212B. For example and without limitation, memory 212B may store a first set of machine codes selected from the native instruction set for accessing application 203, for example to place an order.

Figure 3A:
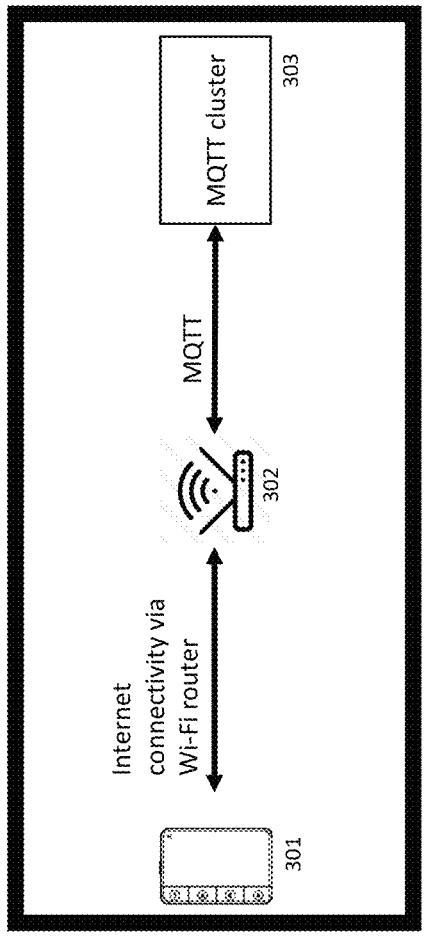
FIGS. 3A-3D relate to data flow within and externally to the IoT device, in various non-limiting embodiments.

FIG. 3A shows a non-limiting exemplary data flow in the device, preferably connected to Wi-Fi, and also preferably without requiring fingerprint authentication. For operation as shown, the user may press any of the buttons on the device shown in 301. The device is preferably connected to a local Wi-Fi router, shown as router 302, that passes device data to the MQTT broker or cluster 303 through the Wi-Fi router. MQTT stands for Message Queue Telemetry Transport. An MQTT functioning component is typically implemented as a broker; a plurality of such brokers may be implemented in a cluster. MQTT is intended as a non-limiting example of an IoT communication protocol; other types of protocols could be used instead. The MQTT cluster is preferably hosted on a server in the cloud. Further details regarding the MQTT are provided below. The device is optionally connected to a Wi-Fi router using an Access Point mode in the device 301.

Figure 3B:
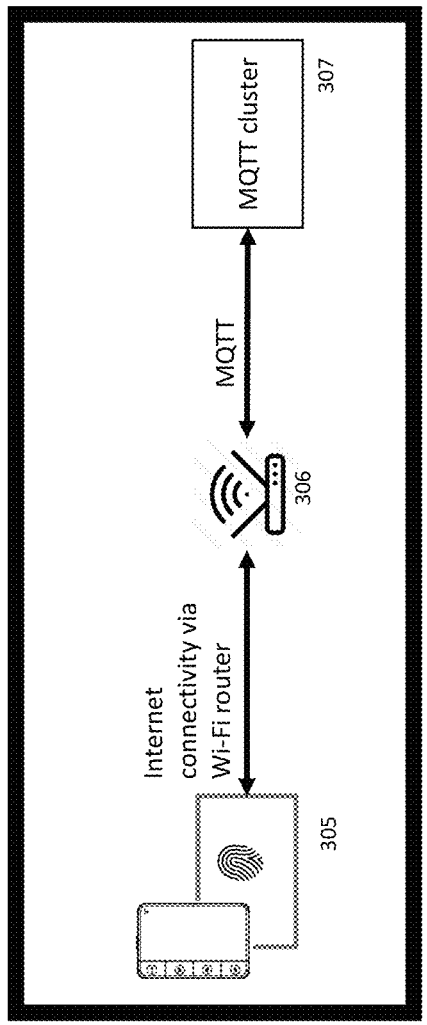

As shown in FIG. 3B, there is provided a data flow within the IoT device; in this case the device is connected to Wi-Fi, preferably with fingerprint and/or RFID authentication. As shown in process 305, the user presses any of the buttons on the device after fingerprint and/or RFID based authentication. Function block 305 includes fingerprint and/or RFID based authentication, and then supports the further pressing of a button on the device by the user, post-identification, to place an order. Fingerprint and/or RFID based authentication may be supported by any suitable hardware/embedded instructions (or firmware) combination.

The device is connected to a local Wi-Fi router shown as 306. It communicates with the local Wi-Fi router 306 to pass the data. The data can then be passed from the device to the MQTT broker or cluster 307 through the Wi-Fi router.

Figure 3C:
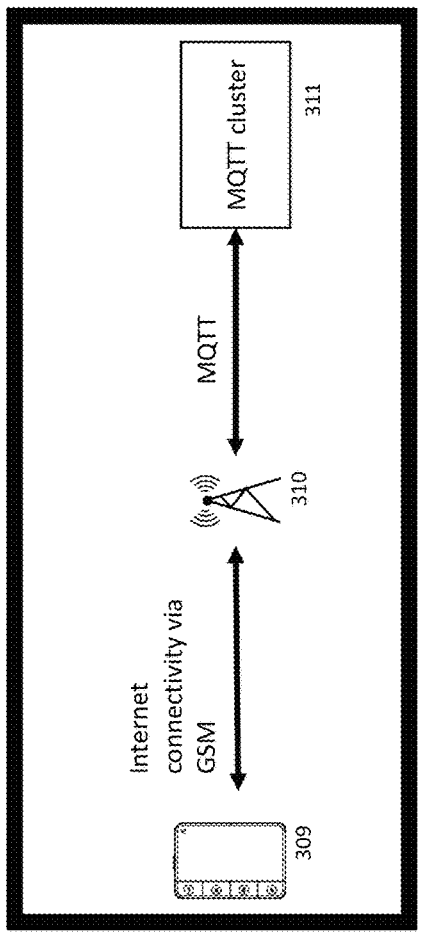

FIG. 3C shows a non-limiting exemplary dataflow within the IoT device, preferably supporting GSM communication or other cellular network communication, for example through a micro-SIM card. Optionally the device is configured without fingerprint authentication. In the process 309, the user presses any of the buttons on the device, while the device is preferably connected to a mobile network, shown as 310. The data is then passed from the device to the MQTT broker or cluster 311 through the GSM connectivity shown as 310.

Figure 3D:
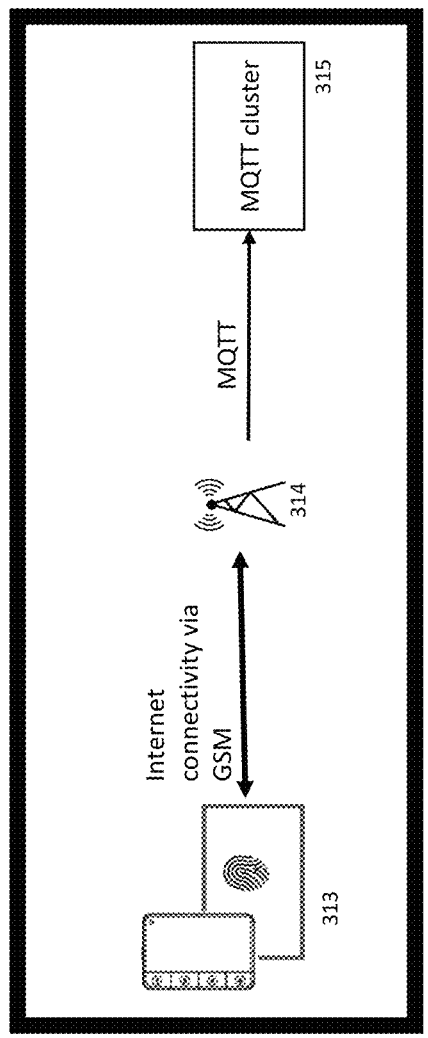

FIG. 3D shows the data flow in the device for a GSM connection with fingerprint and/or RFID authentication in a process 313. The user performs such authentication and then presses any of the buttons on the internet of things device. The device is connected to a mobile network shown as having GSM connectivity 314. The data is then passed from the device to the MQTT broker or cluster 315, through the GSM connectivity shown as 314.

FIG. 4A relates to a non-limiting exemplary end-to-end flow with the user's computational device. Device 404 is able to place orders as previously described upon authentication or at least a button push. As shown, a button press for actions is performed 405 to enable an order to be placed. However, the order can be controlled, such as for example through order cancelation. Preferably such control is provided through an administrator computational device 403. Computational device 403 is notified about the order at notification 406. In response, cancellation, modification or other types of control are shown as order modifications in 406, and are preferably performed by computational device 403. As described in greater detail below, once device 404 receives a request to place an order, notification goes to MQTT broker in the cloud (not shown). The MQTT broker then sends a notification of an event to the web application for the admin, which then notifies the computational device 403, for example.

As shown in FIG. 4B, there is an end-to-end client-side flow, as shown with illustrative details as a non-limiting example only. As shown, an admin or other user computational device 408 is able to connect on the client-side to a web application and server in 413. This allows the computational device, 408 which may, for example, be from admin, to control order setting, order for modification, cancellation, and so forth. Computational support is then provided through a server block 412, which communicates with the IoT device 411. This enables changes to be made in terms of the functioning of the IoT device 411, for example, to set a particular button for a particular type of order or some other type of functionality.

Server block 412 may also update the functionality which has been provided to IoT device 411 through a database 417, which may, for example, be an SQL database. Server block 412 may also listen to changes occurring at database 417, for example through web application 413. Further modifications through the client-side web application 413, may be, for example, to perform device configuration or registration activity 415, order related activity 416, including cancellation and modification. Optionally, device registration module 415 through web application 413 writes to database 417.

Order related activity 416 preferably triggers an email or text notification, shown as email and text notification service 414. This activity can include order placement or cancelation.

Customer order system 418 is a system containing the customer information, to support creating the order. For example, orders may be placed through customer order system 418 manually or automatically, already in place at the customer premises. The order system 418 may listen to changes at database 417, through an API notification, whether as a pull or a push system. As such changes occur, they may automatically trigger an order to be placed by customer order system 418, or a further layer of review may be required. If customer order system 418 is not present, then optionally orders are sent directly from server block 412.

Figure 4C:
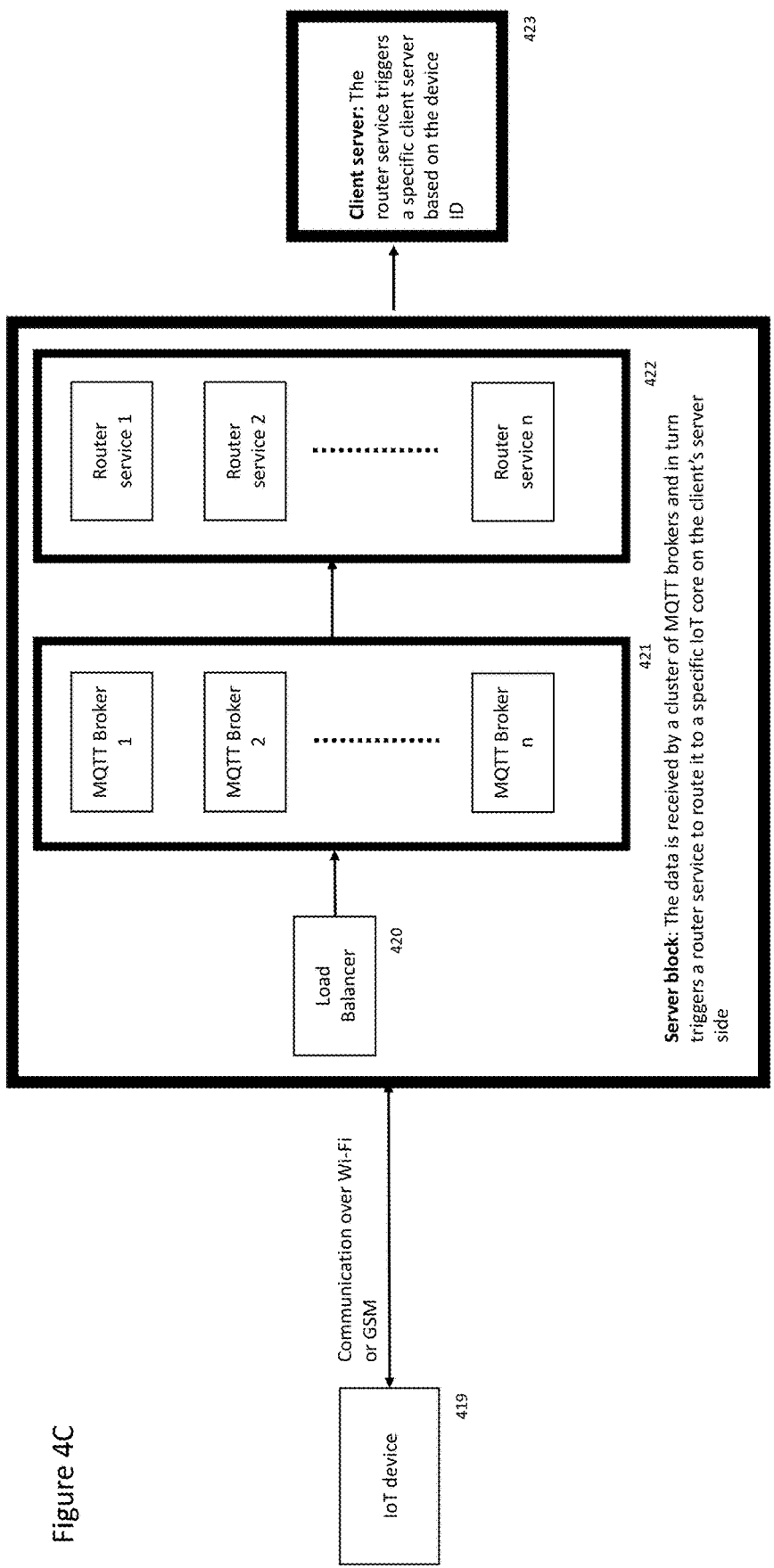

As shown in FIG. 4C, a data flow is provided from the device to the client server. IoT device 419 communicates through Wi-Fi, GSM or some other communication modality with a server block. The server block preferably features a load balancer 420 for enabling data to be distributed among a cluster of MQTT brokers shown as cluster 421. MQTT broker operation is based on publisher subscriber model for data routing, as described with regard to the MQTT standard.

This in turn triggers a routing service, shown as 422, to route the order to a specific IoT core on the client server-side. The client server may then receive the trigger from the routing service to trigger a specific client server based on the device ID that is related to client server 423. Routing service 422 routes messages from brokers 421 to the correct end user or client server 423, of a plurality of such servers (not shown), which may be at various different locations, such as on the premises of a separate company, building, organization or the like.

Figure 4D:
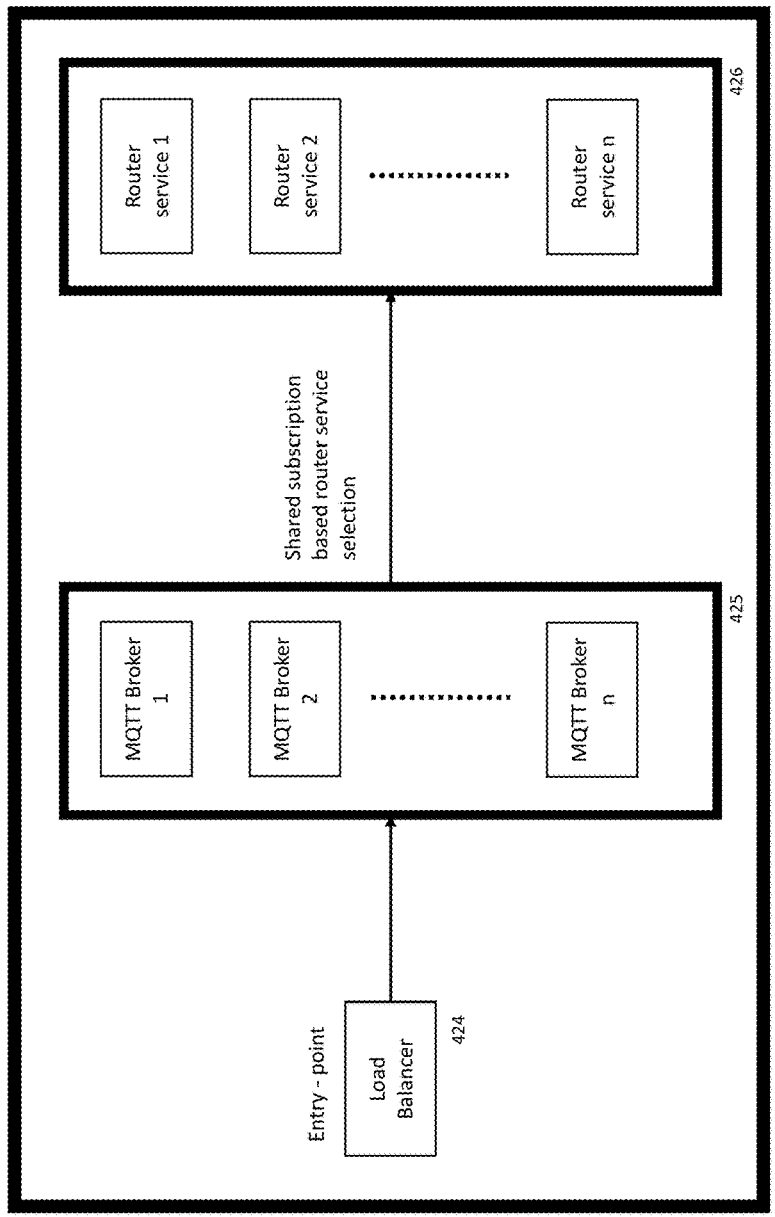

As shown in FIG. 4D, there is provided a server-side data flow. This includes receiving data from the device through the load balancer shown as 424 to trigger a specific MQTT broker in a cluster of brokers 425, which may then trigger a randomly or otherwise selected router service from a cluster of such services 426 based on the shared subscription policy configured in the MQTT broker. Preferably, only one router service is triggered for a particular message, such that the message is locked to that specific router service, to avoid duplication of messages.

FIG. 4E shows a router service flow for authentication. The device ID received from the MQTT broker is then used by the router service for fetching the connection string. This is then used to select the responsive IoT core client to be passed to.

The router service communicates by getting a device ID from an incoming message in 427. The router service uses the device ID to fetch the IoT core connection string. The connection string will contain information about which IoT core to trigger. The router service sends this information to authentication block 428, which can then read the data to and/or write data from a database 429. Once authentication has been performed, it is sent then to one of a plurality of IoT core clients 430. IoT core client 430 is an entry point to a separate client server and acts as a messaging service for the publisher subscriber model.

Figure 4F:
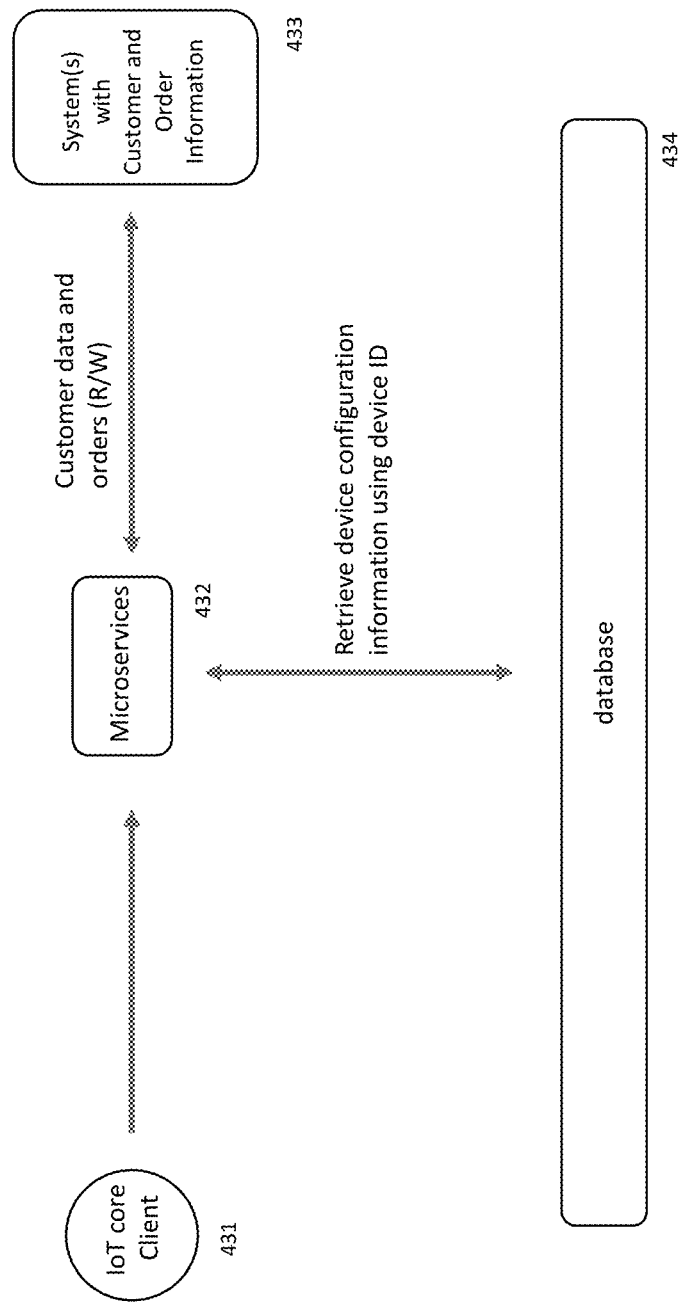

FIG. 4F shows on the client server-side an exemplary order placement data flow. As shown, the IoT core client 431, which has received the order, communicates with a plurality of microservices 432. Microservices 432 provide support for further actions with the order, such as sending customer data and orders, for example, to one or more systems with customer and order information 433. The device configuration information using the device ID may be retrieved from database 434 and communicated to microservices 432.

Figure 4G:
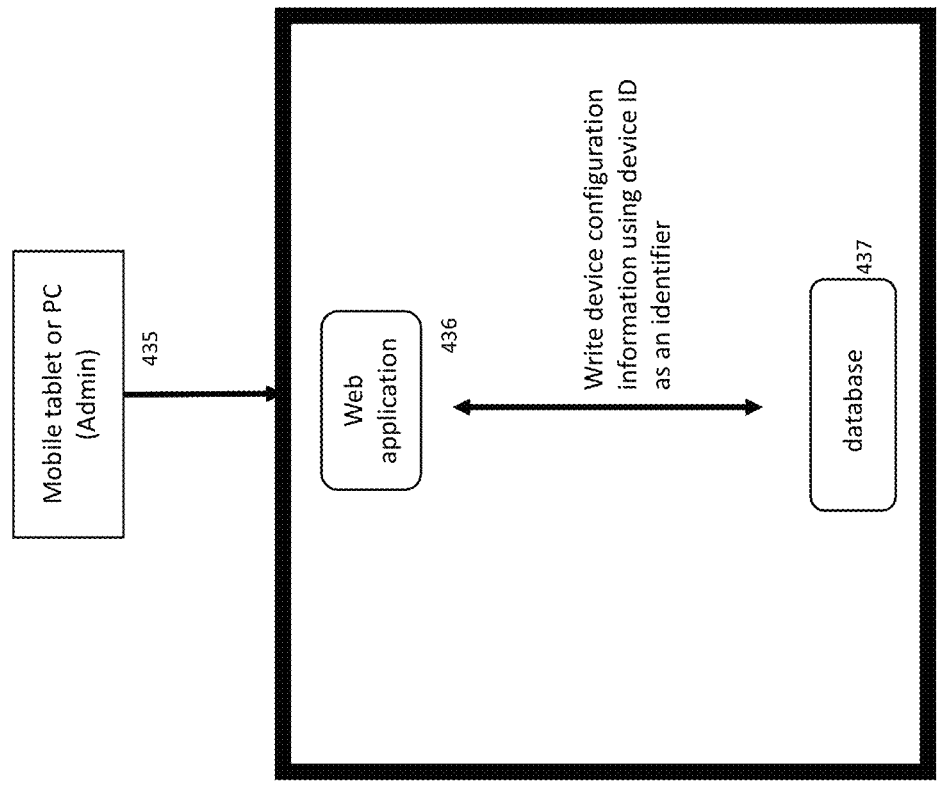

As shown in FIG. 4G, there is provided a flow for the configuration of the device for specific actions on the client server-side. A computational device 435, preferably controlled by an admin, communicates with the web application 436. Web application 436 preferably writes device configuration information used in the device ID as an identifier for the IoT device to a database 437 to allow authentication and order activities to be performed.

Figure 4H:
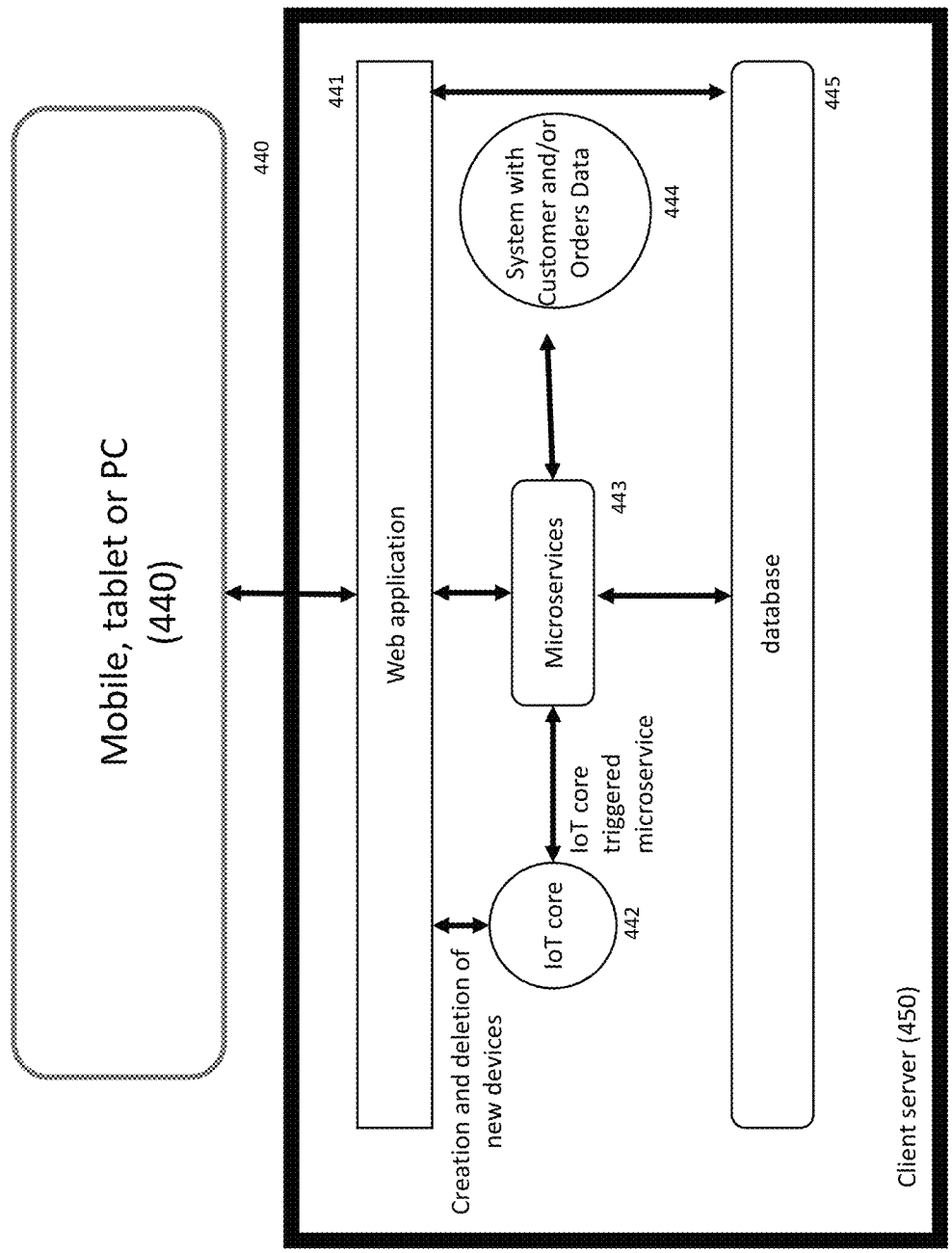

As shown with regard to FIG. 4H, there is provided a client server expanded view. A computational device 440, which may, for example, be controlled by an admin, communicates with a web application 441 as part of a client server 450. Web application 441 then performs creation and deletion of new devices through IoT core 442. It further triggers microservices 443, which communicate with the IoT core 442 as triggered microservice, and further communicates with web application 441.

Microservices 433 preferably also write information to database 445. This database information in database 445 may also be communicated directly with web application 441. Microservices 443 may also communicate with the system with customer and/or orders data 444.

Such an order placement block or system, which permits communication for placing orders, for example, according to supplier data and orders received from microservices, which are in turn preferably received from the IoT core client. The system is then sent to the system with customer and core information and is written in a database. In terms of configuration block, an admin computational device may communicate with the web application for creation and deletion of new services at the IoT core. The IoT core triggered microservice may receive the trigger from the microservices once configured, and so forth as previously described.

Figure 5A:
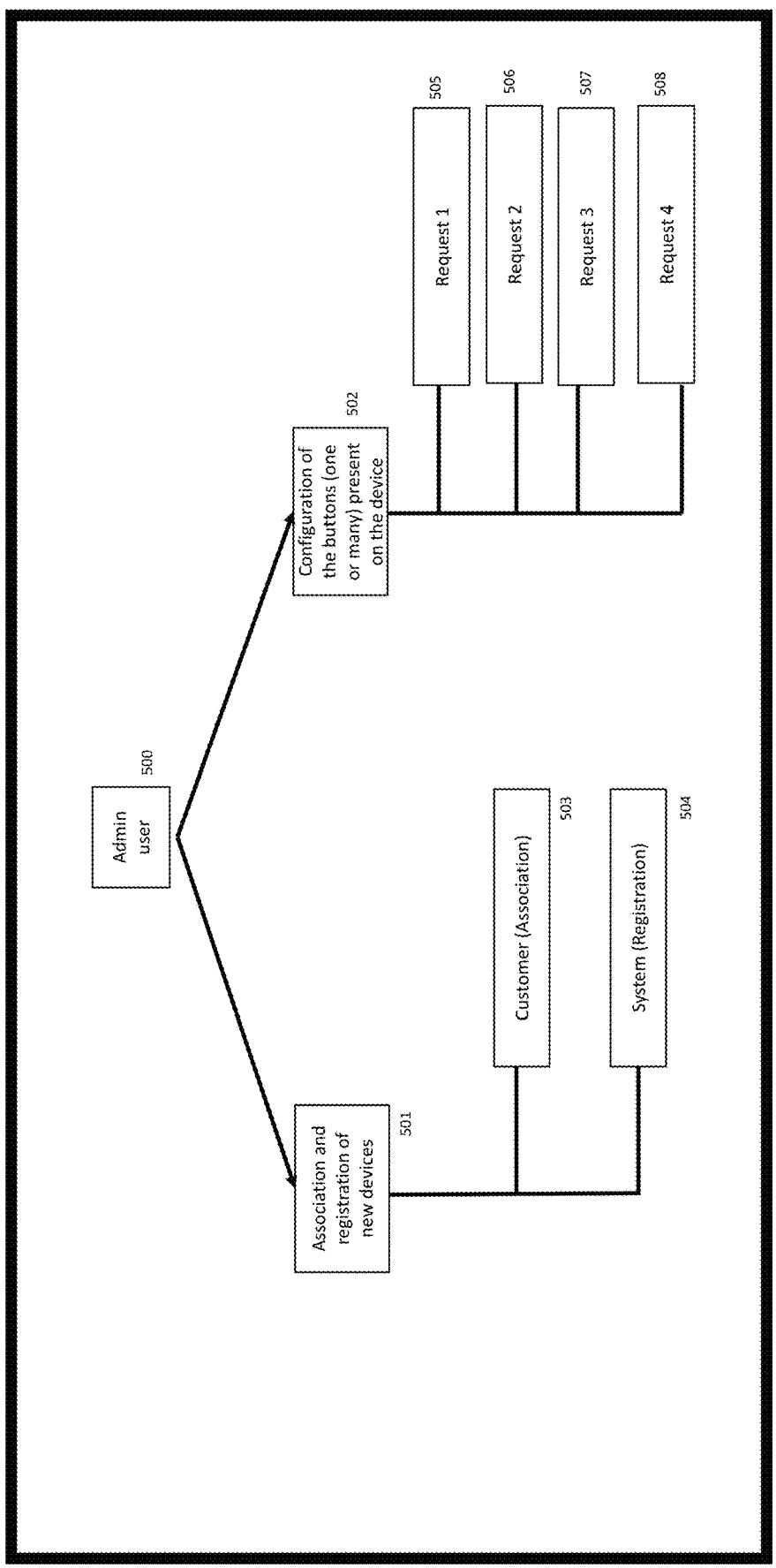
FIGS. 5A-5C relate to non-limiting examples of user roles for controlling the systems as described herein.

FIG. 5A relates to a non-limiting exemplary admin role. An admin user 500, who was identified as an admin user through a particular computational device, may optionally through this computational device control association, registration, new devices 501. For a customer, it is an association 503, but for the system it's a registration 504. The admin functions 500, preferably also include configuration of the buttons, one or many, present on the device 502. A plurality of four requests, shown as request 505, 506, 507 and 508 for the purpose of illustration only and without intent to be limiting.

Figure 5B:
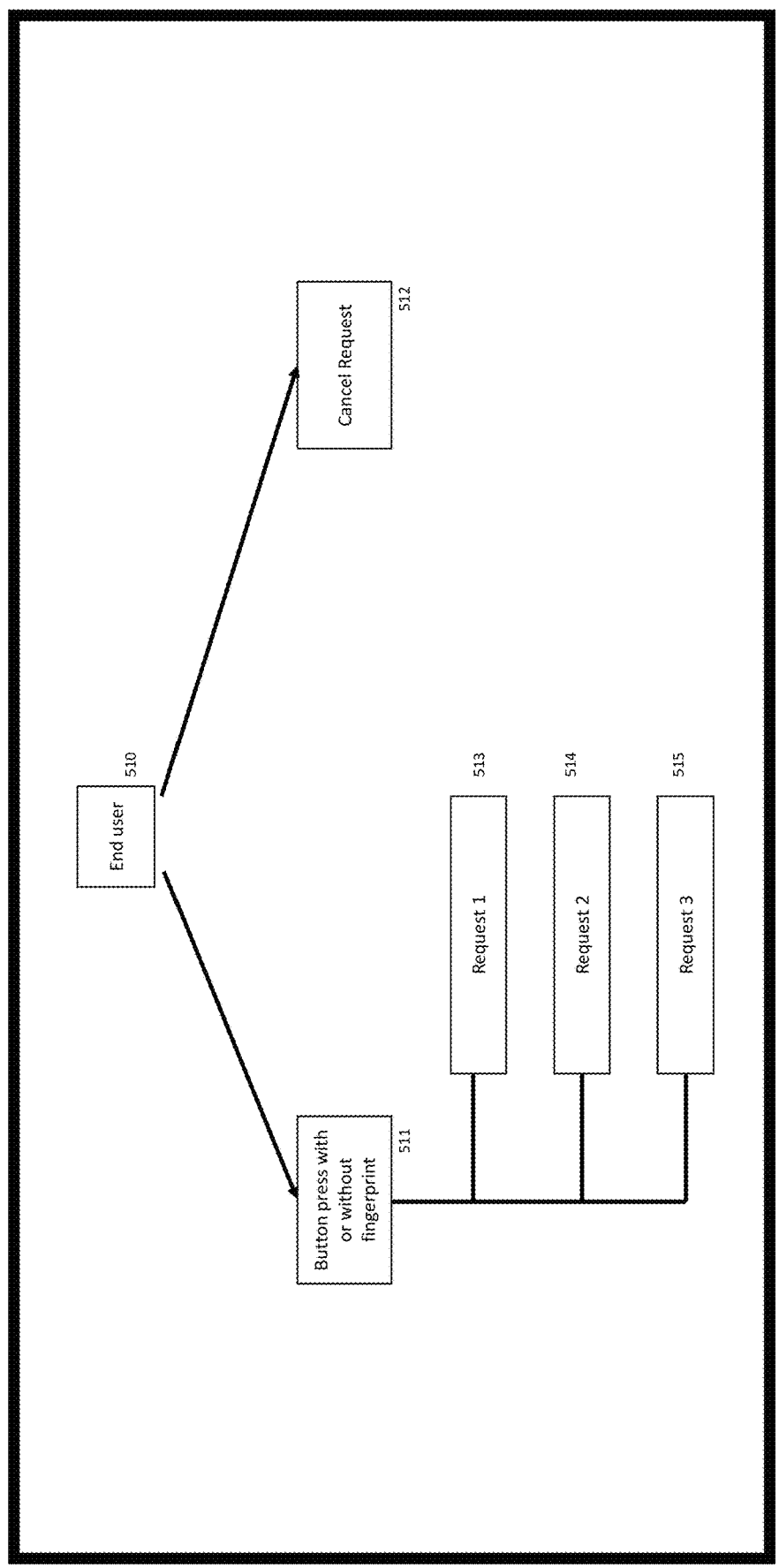

FIG. 5B relates to non-limiting exemplary end user roles. The end user through an end user computational device 510, or through a direct physical action on the device, preferably performs a button press with or without fingerprint and/or RFID authentication 511. This button press may then result in one of a plurality of different requests being issued, such as 513, 514 and 515, or to cancel request shown as 512.

Figure 5C:
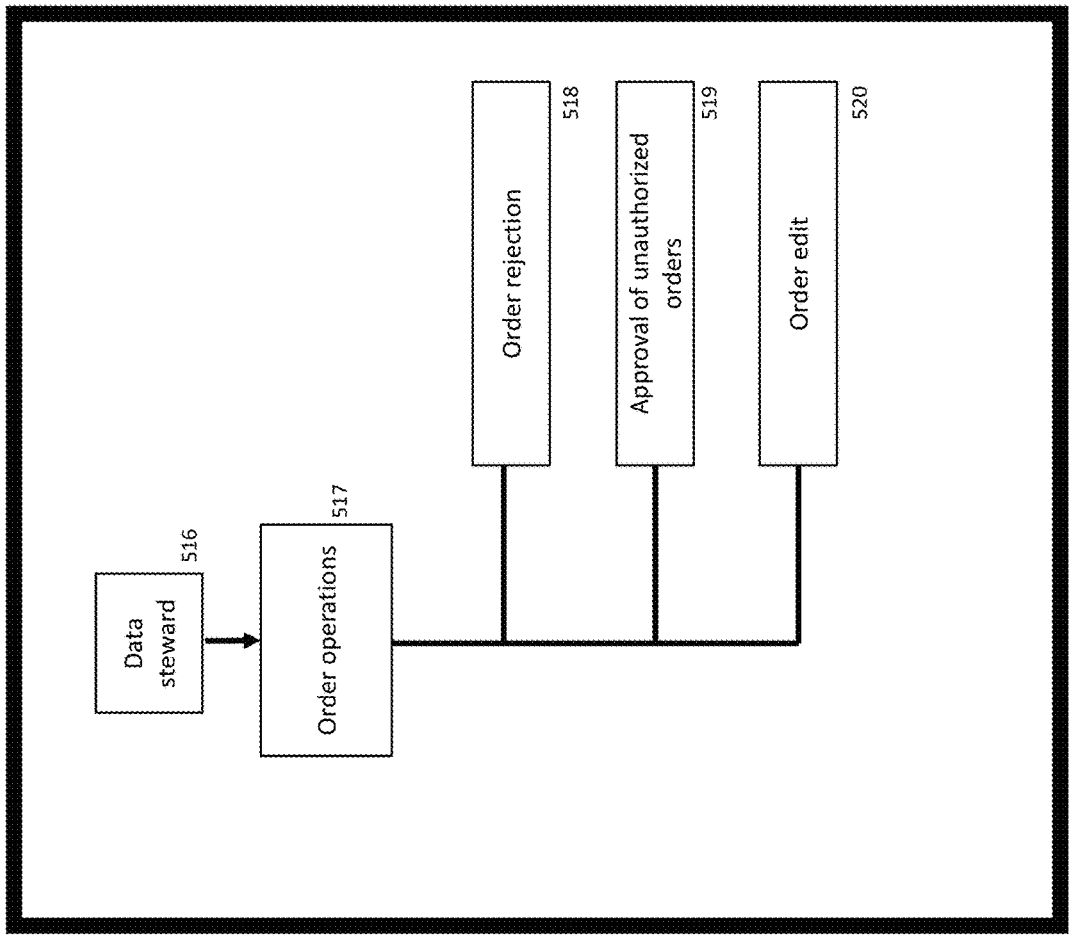

FIG. 5C relates to non-limiting exemplary data steward roles, which may be used, for example, to permit additional oversight on the data. A data steward computational device 516 may, for example, control order operations 517, including order rejection 518, approval of unauthorized orders 519, and order editing 520.

Figure 6:
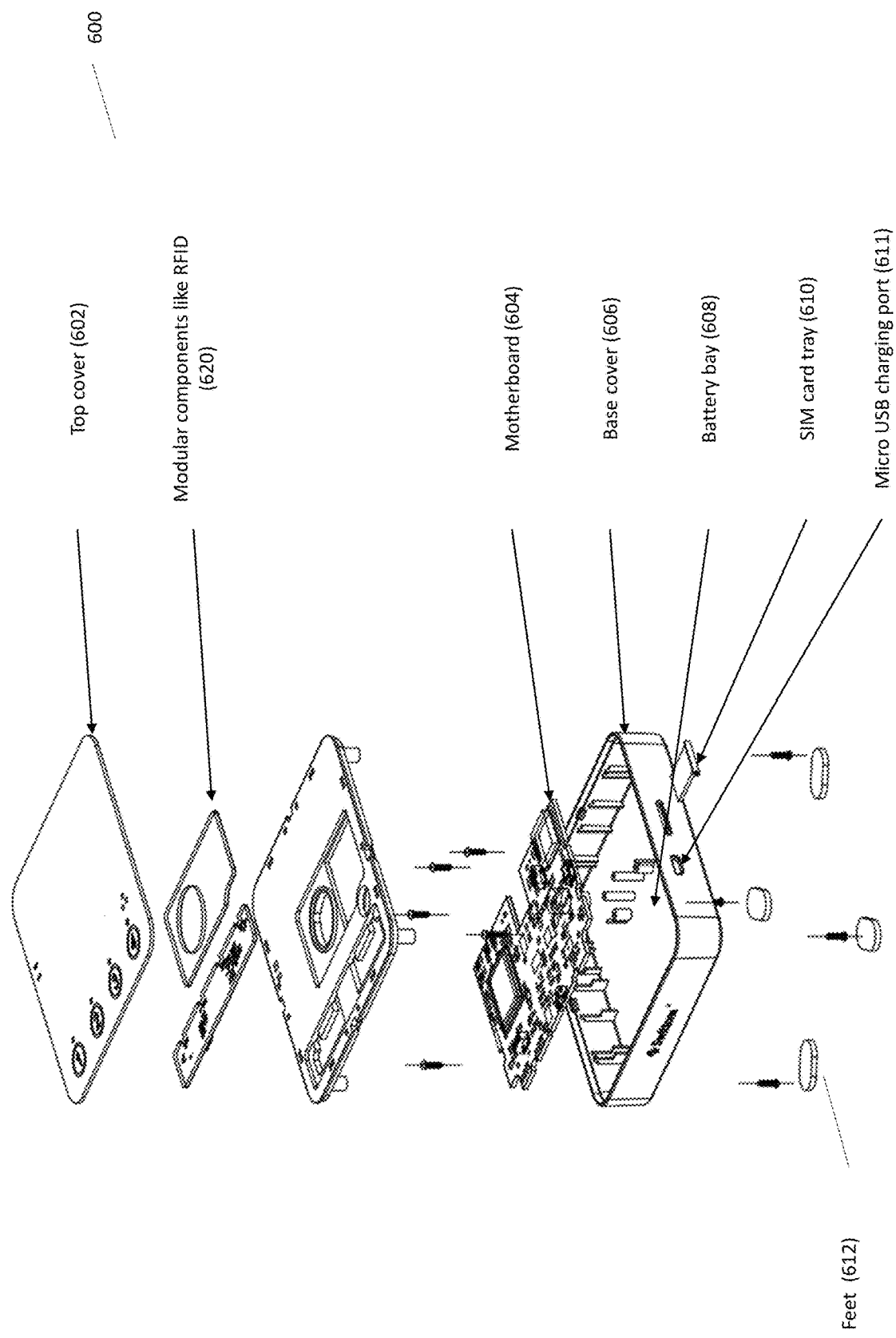
FIG. 6 shows an exemplary, non-limiting diagram of an IoT device in a non-limiting embodiment.
Figure 7:
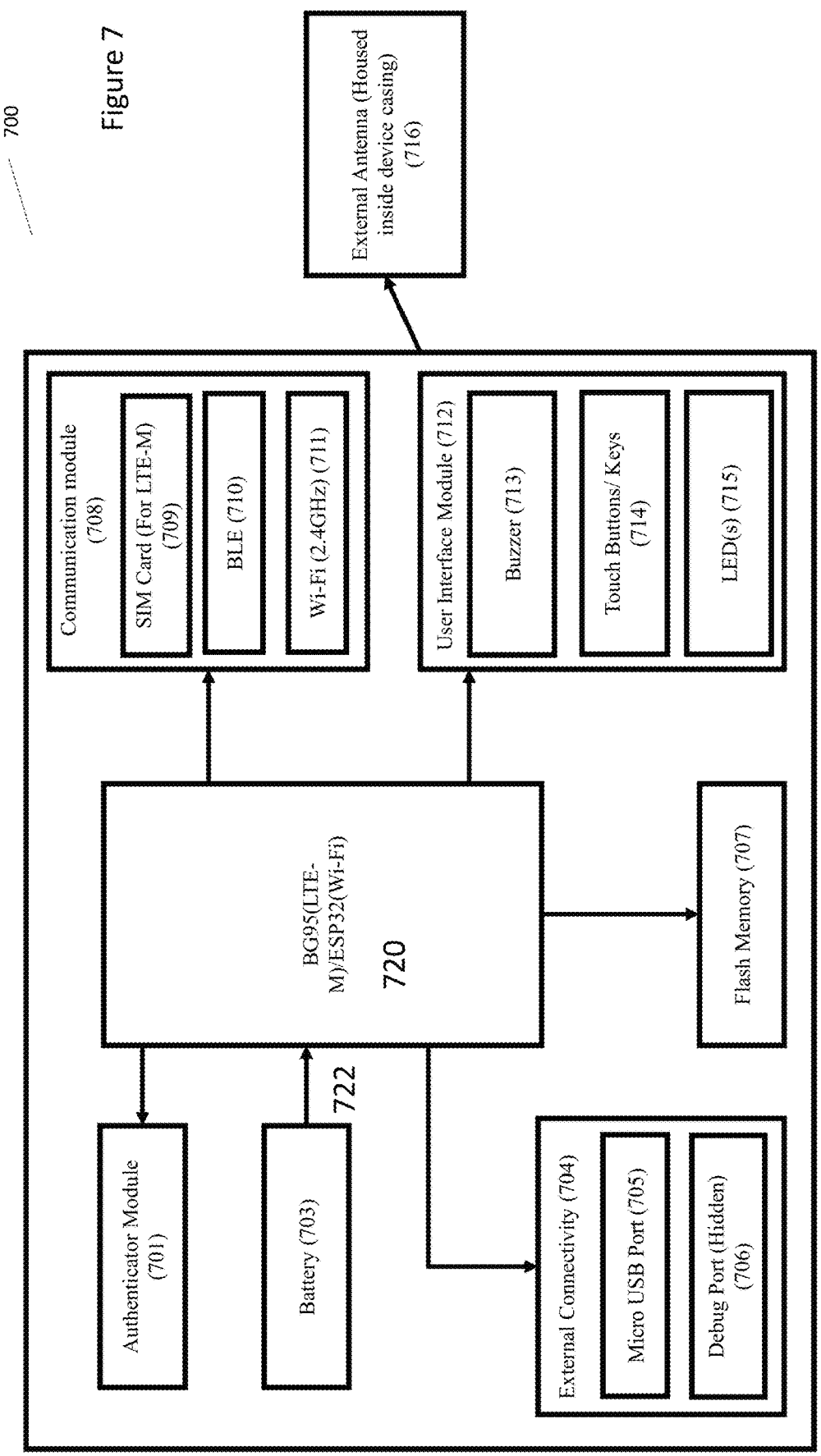
FIG. 7 shows the exemplary, non-limiting diagram of the IoT device of FIG. 6, in a non-limiting embodiment.

FIG. 6 shows an exemplary, non-limiting diagram of an IoT communication device in a non-limiting embodiment. As shown, a device 600 features hardware for authentication and secure communication. Device 600 comprises a top cover 602. A motherboard 604 comprises a plurality of hardware components, a non-limiting example of which is shown in FIG. 7. A plurality of modular components 602, like RFID (if present), are also preferably included. Such components 602 are shown in more detail with regard to the hardware diagram of FIG. 7. A bottom cover 606 preferably features sufficient room for a battery bay 608, for which a battery is shown with regard to FIG. 7.

A SIM card tray 610 is shown to permit a cellular connection, for example for a SIM card or a micro-SIM card. A charging port 611 is also provided, for example as a micro-USB port.

A plurality of feet or rubber sections 612 are preferably attached to bottom cover 606, to increase friction and hence stability for device 600.

FIG. 7 shows the exemplary, non-limiting diagram of the IoT device of FIG. 6, in a non-limiting embodiment. As shown with regard to hardware 700, power is preferably provided by a battery 703, which may for example comprise a 1100 mAh power input, for example through the charging port shown in FIG. 6. A power distribution system 722 supplies power from battery 703 to a limited processor 720, which manages overall functionality of hardware 700. Limited processor 720 has a limited set of functions. Limited processor 720 may for example be implemented as a microcontroller unit with a communication channel, which may for example comprise a cellular modem, a WiFi modem, or a combination thereof. Limited processor 720 may for example be implemented as a BG95(LTE-M)/ESP32. Limited processor 720 is preferably limited in that input/output capabilities are limited and also preferably only limited communication ports are supported. Limited processor 720 may for example comprise a microcontroller or a FPGA (field programmable gate array). Functions of limited processor 720 are preferably arranged such that a user is only able to interact with hardware 700 with a limited, predefined set of inputs and is only able to receive a limited, predefined set of outputs. Optionally and preferably, the limited, predefined set of inputs comprises one or more button pushes and/or an authentication input. The buttons may be physical buttons, switches, sliders, toggles and the like; and/or GUI (graphical user interface) buttons, switches, sliders, toggles and the like. The limited, predefined set of outputs optionally and preferably comprises a sound, a light or the like. Optionally, other outputs are not provided through hardware 700 but instead are provided through an external component in the associated system as described herein.

Hardware 700 is turned off and on through a power switch (not shown).

Secure communication is optionally and preferably supported through an authenticator module 701, which may for example comprise RFID (radio-frequency identification) and/or biometric authentication. For example, for RFID authentication, optionally a card or other physical object is retained and manipulated by an authorized user. The card or other physical object comprises a passive or active tag. When brought into communication proximity, the RFID reader reads the RFID signal and then determines whether the card or other physical object has been authenticated to permit access, in this example to hardware 700 and hence to communication through the device of FIG. 6. Biometric authentication involves viewing a body part of a user to be authenticated, including but not limited to a fingerprint, palm print, retina, iris and the like. If present, authenticator module 701 preferably features an imager or scanner, or is in communication with same (not shown) to receive the biometric information for authentication.

Communication between authenticator module 701 and limited processor 720 is preferably performed according to SPI (Serial Peripheral Interface) based communication. SPI communication features a continuous stream of data rather than packets. Limited processor 720 is the controlling device while authenticator module 701 receives instructions from limited processor 720, and reports back with data accordingly. A clock is used to maintain synchronization of communication between authenticator module 701 and limited processor 720.

A user interface module 712 preferably supports communication of indicators to the user, including without limitation acceptance or rejection of authentication, success or failure of communication, charging status, input of communication and the like. User interface module 712 preferably communicates with limited processor 720 according to the General Purpose Input Output (GPIO) interface. Optionally user interface module 712 comprises one or more of a display screen, a touchscreen, a touch button, a sound generation component or an LED. In a preferred embodiment, user interface module 712 is limited to the previously described limited inputs and outputs, and so features only a physical and/or virtual button or other limited input 714 as described herein, a sound output 713 such as a buzzer, and a light output 715 such as a LED. In a non-limiting embodiment, user interface module 712 comprises 4 touch buttons, 1 buzzer and 6 LEDs. This combination may be provided to support a simple interface for the user to input information, through the touch buttons, and to receive information in return, such as for example notifications, through the buzzer and LEDs combination.

The user may for example initiate communication by pressing a button 714 as part of user interface module 712. Limited processor 720 would then instruct authentication module 701 to receive user authentication. If sufficient for authentication, then limited processor 720 would accept the instructions from the user in the form of the touch button push and/or other interactions with the limited input(s) of user interface module 712. Additionally or alternatively, limited processor 720 determines authentication according to communication with another external device, as described with regard to FIG. 8.

Hardware 700 preferably comprises a communication module 708, which may for example include cellular or WiFi connectivity as described herein. Communication module 708 may be implemented according to a BG95-M3, which comprises multi-mode LPWA modules implemented according to Multi Mode EGPRS (enhanced GPRS (General Packet Radio Service)) for data communication. Communication between communication module 708 and limited processor 720 is preferably performed according to UART (Universal Asynchronous Receiver/Transmitter) based communication, for example for the previously described authentication and/or user communication. UART communication is hardware based, through a physical circuit.

In this non-limiting example, communication module 708 comprises a SIM card 709, which may for example comprise a SIM card, a micro-SIM card or a NANO-SIM card. SIM card 709 enables correct identification and authentication of hardware 700 (and hence of device 600) on the cellular network. The cellular network for example may comprise one or more of LTE-M, Cellular or NB-2. Communication module 708 may also communicate with an external antenna 718, which enables signals to be sent to and received from the cellular network, which for example may comprise one or more of LTE-M, Cellular or NB-2. External antenna 718 is preferably separate from the motherboard but is still preferably contained within the casing for device 600 (not shown).

Communication module 708 may also feature a Bluetooth module 710, which is more preferably a BLE (Bluetooth low energy module). Bluetooth module 710 may support communication with another device, which may in turn relay outgoing messages from, and send back incoming messages to, hardware 700. Bluetooth module 710 may be provided in addition to, or in place of, SIM card 709.

Communication module 708 may also feature a WiFi module 711, which may for example be a 2.4 GHz module.

Preferably, an external connectivity module 704 is provided to enable direct communication with hardware 700. Optionally a debug port 706 is provided for hardware and/or firmware debugging. Also optionally, a micro-USB port 705 is provided for powering the device, and for this embodiment, charging battery 703.

Hardware 700 also optionally and preferably features a flash memory 707. Limited processor 720 is able to write data to, and read data from, flash memory 707. Flash memory 707 may also store instructions for operation of hardware 700.

With the exception of external antenna 716, preferably all components shown are located on the motherboard.

Figure 8:
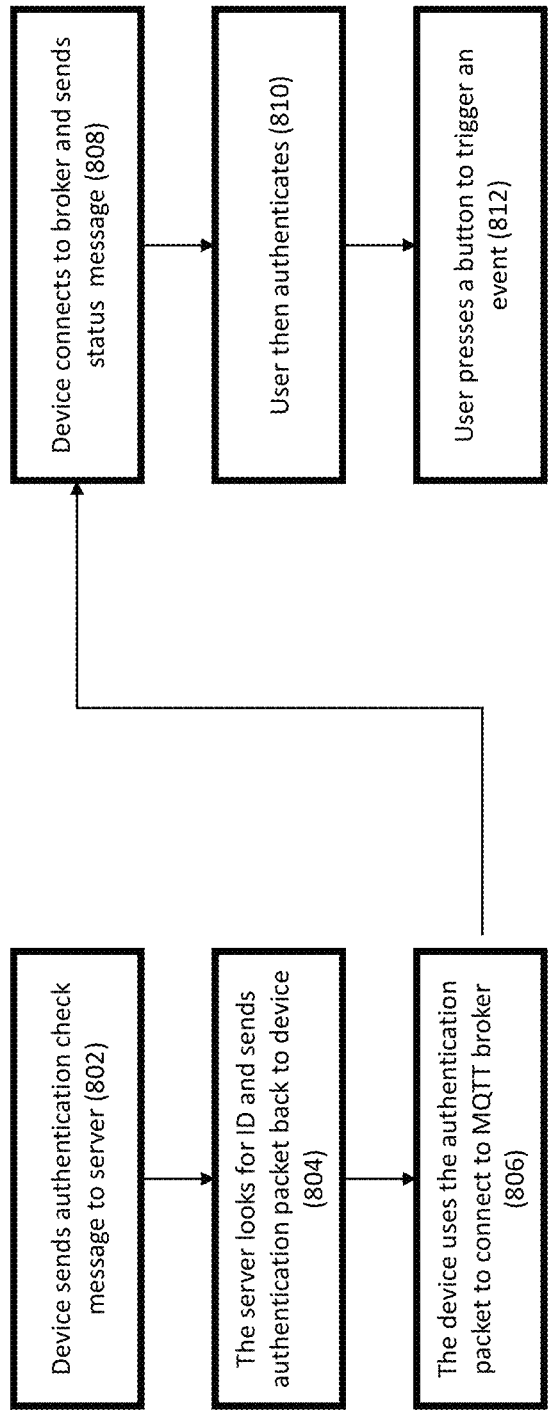
FIG. 8 shows an exemplary method for operating a device according to FIG. 6 or 7.

FIG. 8 shows an exemplary method for operating a device according to FIG. 6 or 7. A non-limiting exemplary flow for securely sending communication is shown, according to the device side software flow. The flow is described with regard to the device of FIGS. 6 and 7. The communication may include without limitation placing an order. An order may include but is not limited to, ordering a product or service to be provided or delivered; or causing any electronic action or set of actions to be performed. In a flow 800, steps 802-806 preferably comprise an authentication flow for authenticating the device, while steps 808-812 preferably comprise a flow for authenticating the user on that device and then permitting the event flow to occur.

At 802, the device sends authentication check message to a server. As previously described, this message is preferably initiated through some action by the user to be authenticated, for example by pressing a button on the device. The user is then authenticated as previously described, for example with an RFID card or other physical object, and/or through biometric authentication. Optionally, user authentication information is not stored on the device, such the device sends a message comprising the user's authentication information to the server.

Alternatively, user authentication occurs later in the flow, such that the device sends a request to start the authentication protocol to the server by first seeking identification of the device to the server, as part of a handshake protocol.

At 804, the server looks for ID and sends authentication packet back to the device. For example, the server preferably determines whether the received authentication information relates to an actual authenticated user. If so, then the server locates the authorized user associated with that information, in order to identify the user. The server then sends an authentication message back to the device, for example comprising an authentication packet.

Alternatively, the server looks for an identifier related to the device itself, without regard to authentication of the user at this stage. If the server finds an identifier related to the device, then it returns the authentication message back to the device. In either case, the device preferably requires receipt of this message before supporting further communication from the device.

At 806, the device uses the authentication packet to connect to MQTT broker. MQTT stands for Message Queue Telemetry Transport. An MQTT functioning component is typically implemented as a broker; a plurality of such brokers may be implemented in a cluster. MQTT is intended as a non-limiting example of an IoT communication protocol; other types of protocols could be used instead.

At 808, the MQTT broker accepts the authentication packet as part of a handshake protocol to begin communication with the device. The device then sends a status message to the broker as part of the handshake process.

If the user has not yet authenticated, then the user performs the above-described authentication process at 810. If authentication is successful, then at 812 the user presses a button to trigger an event.

Figure 9:
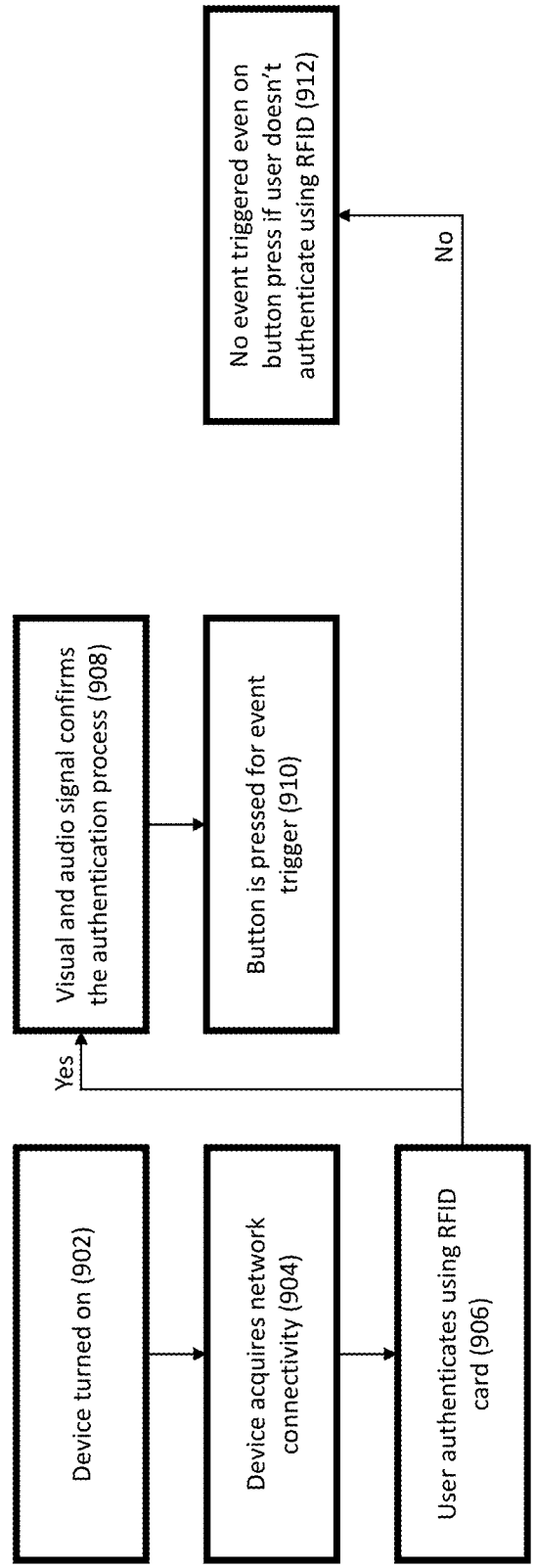
FIG. 9 shows a non-limiting, exemplary authentication flow for an IoT device as described herein.

FIG. 9 shows a non-limiting, exemplary authentication flow for an IoT device as described herein. The non-limiting exemplary flow is for RFID authentication for the IoT communication device. The flow 900 preferably begins at 902 by turning the device on. At 904, the device preferably acquires network connectivity. Such network connectivity may for example comprise one or more of LTE-M/CAT-1M/Wi-Fi. The user then optionally authenticates by using a RFID card at 906. Preferably the RFID card reader is activated upon turning the device on.

At 908, if authentication is successful, preferably a visual and/or audio signal confirms the authentication process to the user. For example, an LED light may turn on and/or may flash, and/or a buzzer may sound. At 910, the user may press a button for the event trigger as previously described.

If authentication is not successful, then at 912, preferably even a button press does not cause an event trigger. Optionally a buzzer sound or other alarm indicates that user is not authenticated.

Figure 10:
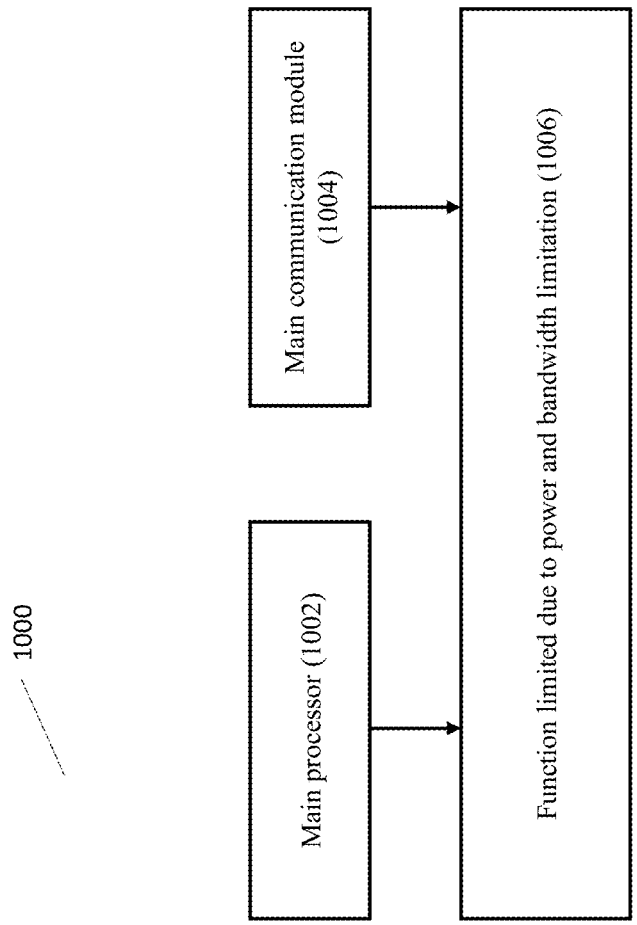
FIG. 10 shows an exemplary schematic of internal components of the IoT device of FIG. 6 or 7.

FIG. 10 shows an exemplary schematic of internal components of the IoT device of FIG. 6 or 7, indicating the limited functions of the IoT communication device. An internal component schematic 1000 preferably only features a main processor 1002, which is preferably a limited function processor as described herein. Main processor 1002 controls functions of main communication module 1004. The functions of both main processor 1002 and main communication module 1004 are preferably limited according to the provided firmware 1006. Some features from the module (chipset) that comprise main processor 1002 and optionally also main communication module 1004 are preferably disabled for efficiency and limitation due to network bandwidth and power bandwidth. For example and without limitation, preferably the following functions are disabled: non used general purpose input/output; non-essential communication ports; and debug mode. Also preferably the provided firmware activates deep-sleep of the IoT communication device after a time period of inactivity.

Figure 11:
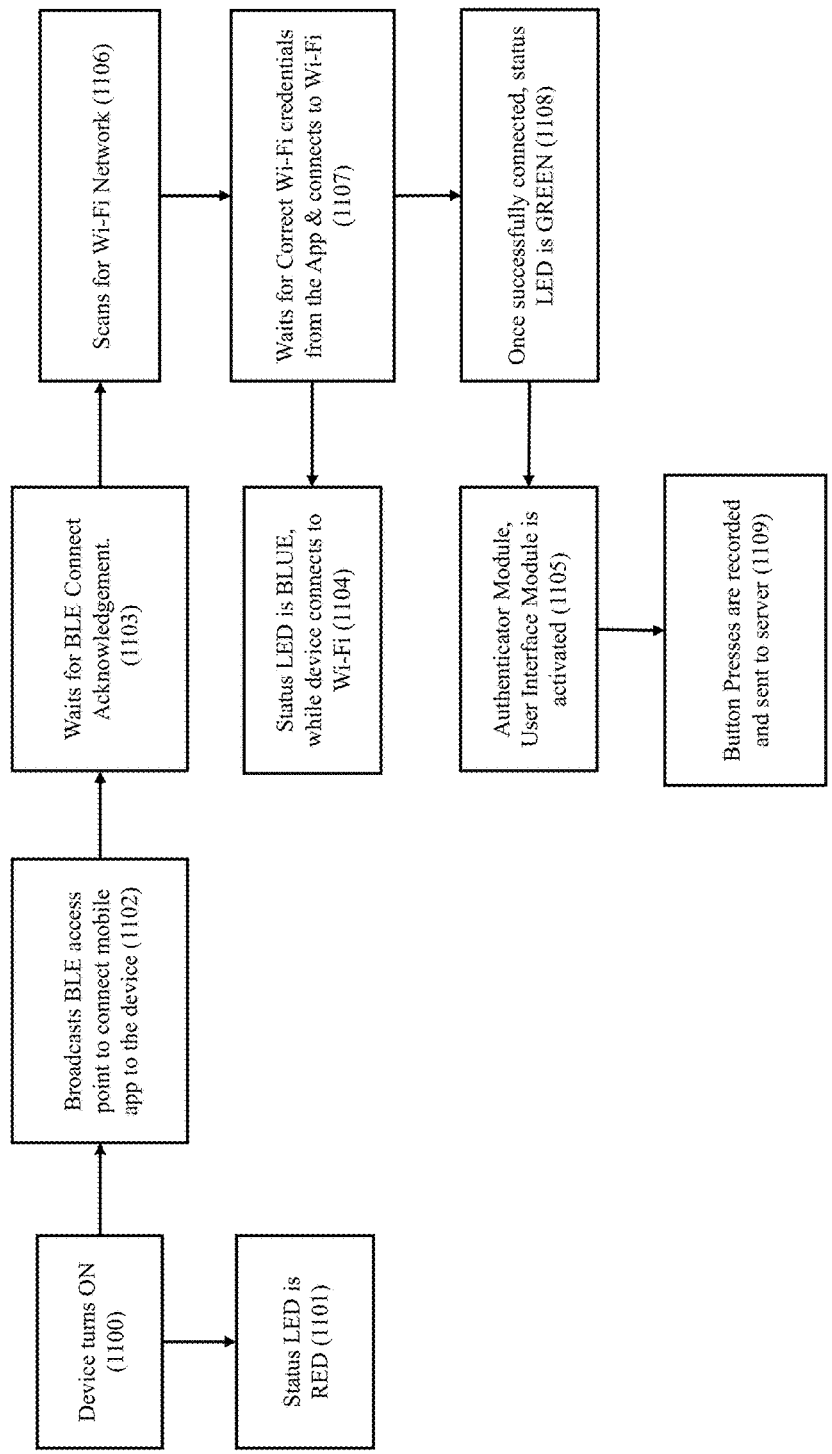
FIG. 11 shows a further non-limiting, exemplary event flow for an IoT device as described herein.

FIG. 11 shows a further non-limiting, exemplary event flow for an IoT device as described herein. The flow begins at 1100, when the IoT communication device turns on. The device preferably shows an indication that it is not yet ready to receive instructions at 1101, for example in the form of a red LED light. The IoT device then broadcasts availability of a BLE (Bluetooth low energy module) access point to connect a mobile app of an associated mobile communication device to the IoT device at 1102. For devices with WiFi, the mobile app of the associated mobile communication device may be used to configure the IoT device to communicate through the required network.

The IoT device then waits for a BLE connect acknowledgement at 1103. The IoT device then scans for a Wi-Fi Network at 1106, as preferably the IoT device communicates directly with the internet through a Wi-Fi Network. Bluetooth connectivity is preferably used to support communication between the IoT device and the mobile app of the associated mobile communication device, and/or another sensor or sensors. The IoT device then waits for the correct Wi-Fi credentials from the mobile app, which are preferably transmitted through the previously described BLE connectivity. Upon receipt of these credentials, the IoT device connects to the Wi-Fi network at 1107.

While the IoT device is waiting for Wi-Fi connectivity, it may indicate a waiting status at 1104, for example with a blue LED light.

Once the IoT device successfully connects to the Wi-Fi network, it preferably indicates a success status at 1108, for example with a green LED light. The authenticator module and user interface module are then preferably activated at 1105, as authentication is preferably required at this point. Once authentication has occurred, user inputs, such as button presses for example, are transmitted to the server at 1109.

Figure 12:
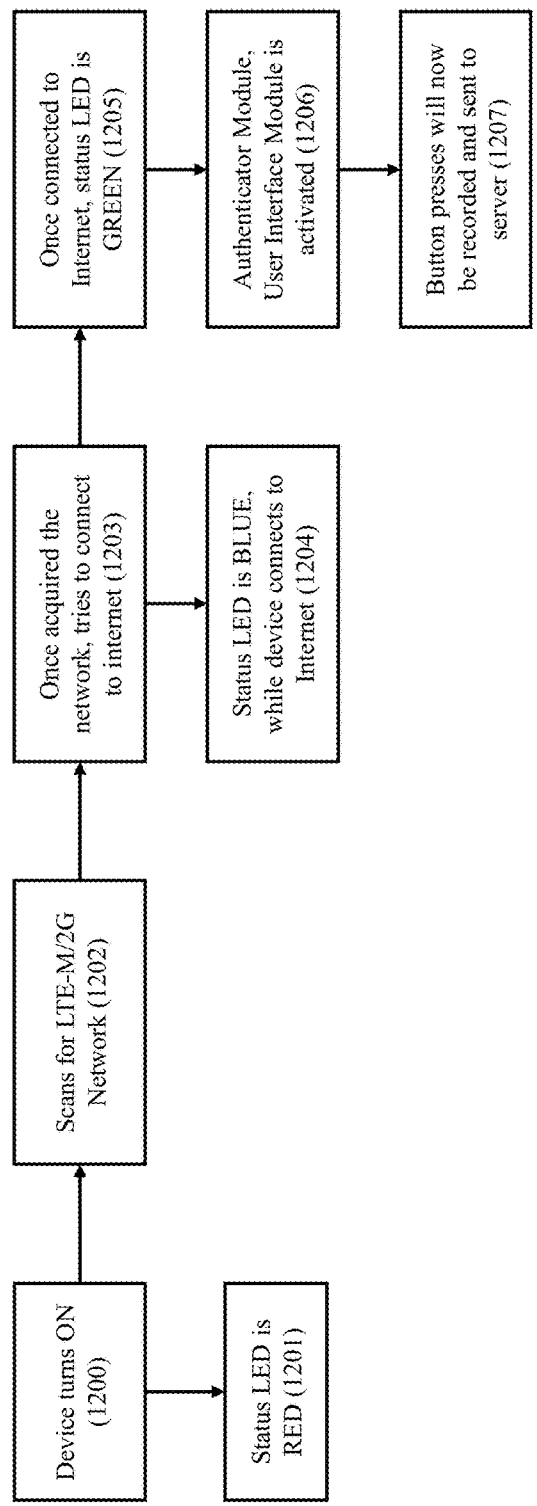
FIG. 12 shows a further non-limiting, exemplary event flow for an IoT device communicating through a wireless network as described herein.

FIG. 12 shows a further non-limiting, exemplary event flow for an IoT communication device communicating through a wireless network as described herein. The flow begins at 1200, when the IoT communication device turns on. The device preferably shows an indication that it is not yet ready to receive instructions at 1201, for example in the form of a red LED light.

Next, the IoT communication device scans for a wireless network, such as the LTE-M/2G cellular network at 1202. Once the IoT device acquires the wireless network connectivity, it attempts to connect to the internet at 1203. While the IoT device is waiting for internet connectivity, it may indicate a waiting status at 1204, for example with a blue LED light.

Once the IoT device successfully connects to the internet, it preferably indicates a success status at 1205, for example with a green LED light. The authenticator module and user interface module are then preferably activated at 1206, such that authentication is preferably required at this point. Once authentication has occurred, user inputs, such as button presses for example, are transmitted to the server at 1207.

Figure 13:
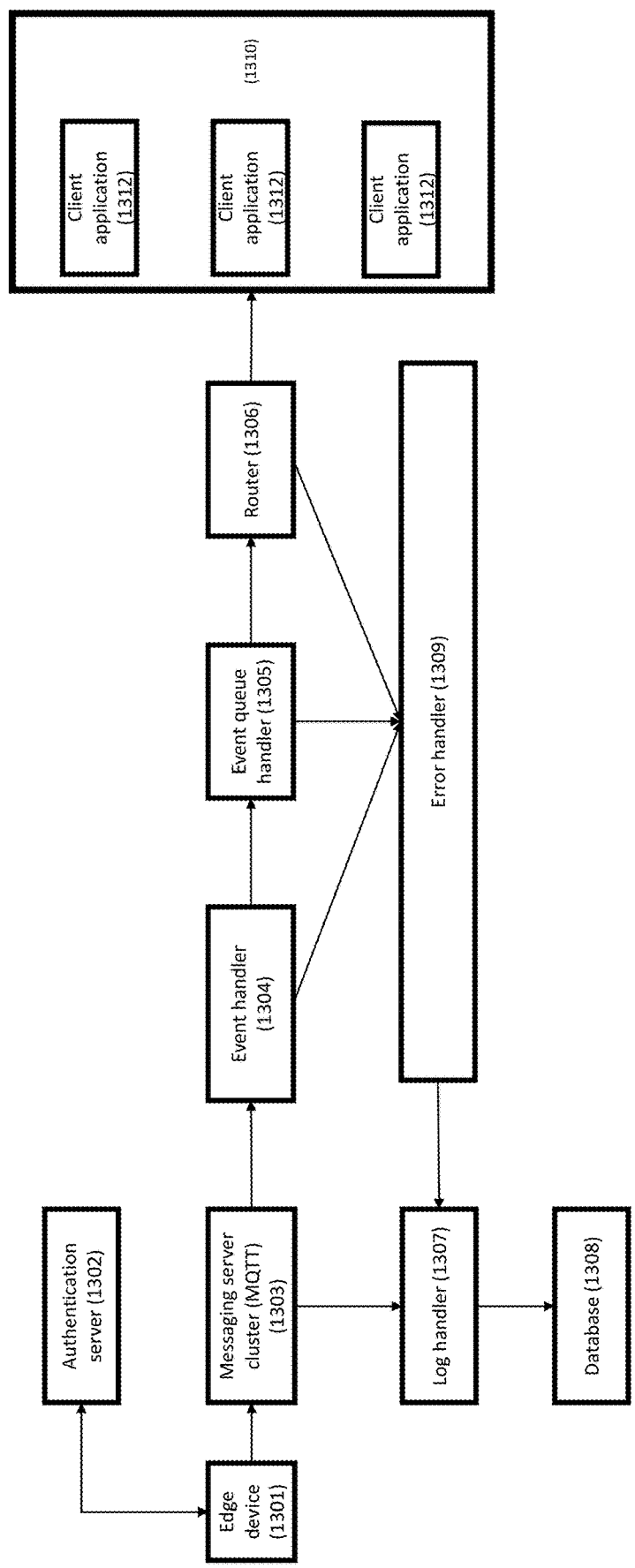
FIG. 13 shows a non-limiting, exemplary event handling flow for a system as described herein.

FIG. 13 shows a non-limiting, exemplary event handling flow for a system as described herein. As shown in a flow 1300, an edge device 1301 is preferably in communication with an authentication server 1302 and a messaging server cluster 1303. Edge device 1301 may be an IoT communication device that is implemented with regard to FIGS. 6 and 7 for example. Edge device 1301 enables a user to be authenticated and then to communicate with a remote server for sending one or more messages to initiate an event, for example to purchase a product. Such authentication is preferably performed through communication with authentication server 1302, for example as described with regard to FIG. 8.

Messaging server cluster 1303 preferably receives these messages and may be implemented as a MQTT (Message Queue Telemetry Transport) server, for example as described with regard to FIG. 8. Messaging server cluster 1303 preferably acts as a broker for these messages. In this non-limiting example, messaging server cluster 1303 preferably passes a message from edge device 1301 regarding an event to an event handler 1304. If the event information is correct or at least recognizable as an event, event handler 1304 then passes the message regarding the event to an event queue handler 1305. Event queue handler 1305 may then pass the message to a router 1306 for each message in the queue.

Router 1306 then preferably determines which client application 1312 is to receive the message regarding the event. Client applications 1312 may be operated by a computational device 1310 or a plurality of such devices. Routing may be determined for example with regard to the identification of the specific edge device 1301 which sent the message and/or according to information within the body of the message, for example regarding the specific client application 1312 that is to receive the message. Client applications 1312 may handle a variety of different actions, for example for ordering products, requesting information, reporting a problem with a previous order. Optionally specific clients are associated with specific edge devices.

An error handler 1309 preferably receives error messages from each of event handler 1304, event queue handler 1305 and router 1306. For example, event handler 1304 may pass messages regarding events that are incorrectly formatted, incorrect, not recognized as an event message or otherwise in error to error handler 1309.

Messaging server cluster 1303 preferably also sends at least meta data regarding the message and optionally the entire message or a portion thereof to a log handler 1307. Log handler 1307 may then log this information in a database 1308 for later retrieval, for example for quality control. Log handler 1307 also preferably receives error messages from error handler 1309, again for logging in database 1308.

Figure 14:
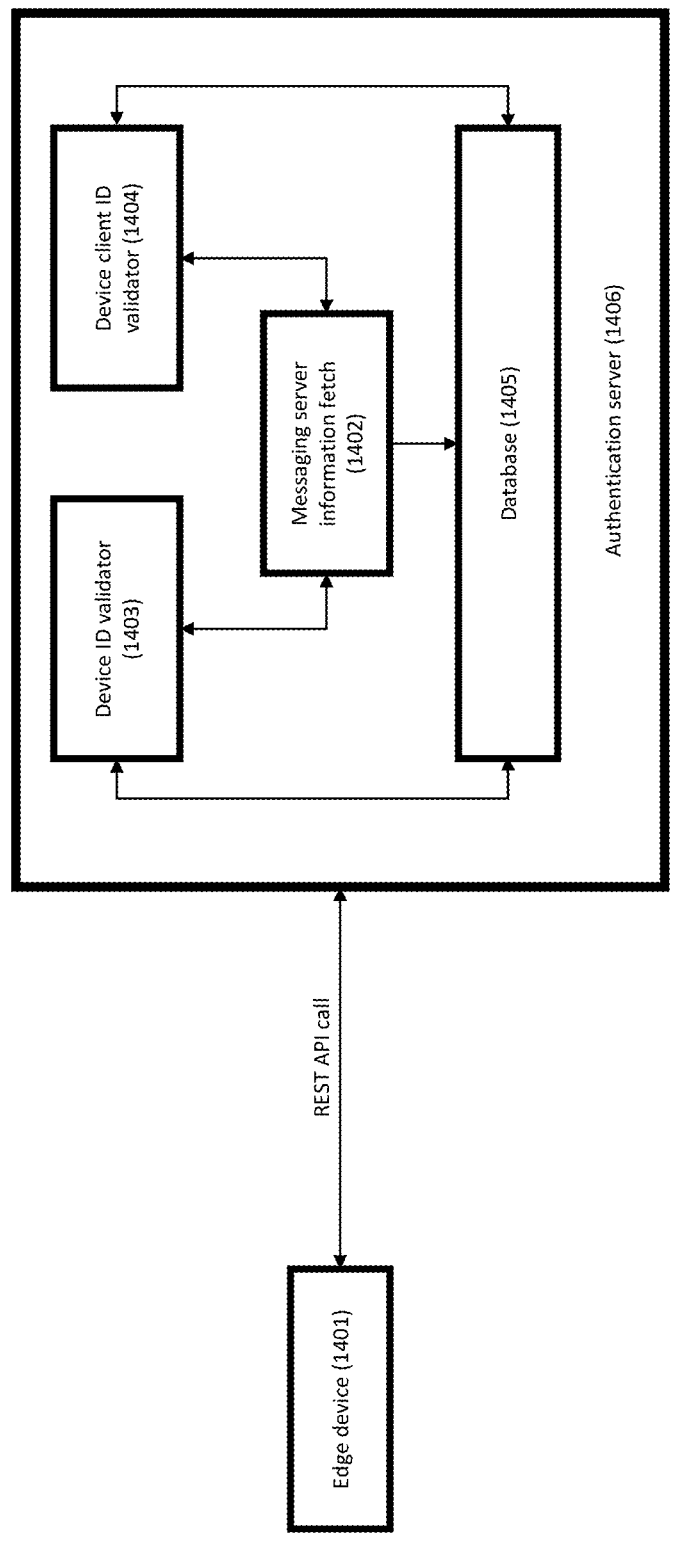
FIG. 14 shows a non-limiting, exemplary system for authentication for an IoT device as described herein.

FIG. 14 shows a non-limiting, exemplary system for authentication for an IoT communication device as described herein. As shown in a flow 1400, an edge device 1401 preferably triggers a REST API call to an authentication server 806, for example through the internet as previously described. Edge device 1401 is a non-limiting example of an IoT communication device as described herein. Authentication server 1406 receives the request and determines whether the request is valid. If the request is valid, authentication server 1406 validates the request to send out the MQTT credentials from the database, such as a database 1405 as shown.

For validation of the request, authentication server 1406 preferably analyzes at least the identifier for edge device 1401 (device ID) and also an identifier for the client (client ID). Optionally and preferably both are analyzed for a complete authentication process. Authentication server 1406 preferably comprises a device ID validator 1403 for validating the device ID, for example according to a hash and/or lookup table. Authentication server 1406 preferably comprises a client ID validator 1404 for validating the client ID, for example according to a hash and/or lookup table. Each of device ID validator 1403 and client ID validator 1404 is preferably in communication with a messaging server information fetch 1402 for complete authentication and validation.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for controlling an offline event, comprising a computer network, an IoT device for triggering the offline event, wherein the device is controllable by a user, the device comprising a computer network connection to the computer network, a first processor and a first memory, wherein said first memory stores a plurality of instructions for triggering the offline event and wherein said first processor executes said plurality of instructions; wherein said first processor is a limited function processor;

a server for receiving the trigger for the offline event from the device through the computer network; and a user computational device for receiving a notification of the trigger for the offline event from the server, wherein the user computational device is able to control the offline event and to update at least one parameter of the offline event at the server, the user computational device comprising a user interface for receiving instructions from the user and for displaying information from the server, and a computer network connection to the computer network;

wherein said device for triggering the offline event comprises at least one button for receiving a trigger input, at least one sensor for receiving a trigger input, or both; wherein said at least one button, said at least one sensor or both comprises a direct input for directly triggering an action;

the system further comprising a separate application, wherein said separate application is accessible through the user computational device and wherein said separate application modifies or cancels the offline event at the server according to one or more user commands entered through the user computational device and executed by the separate application at the server; wherein one or more instructions are received through said separate application for modifying the trigger; and wherein said separate application determines execution of said action that is triggered according to one or more rules, such that said execution is performed automatically upon being triggered by said at least one button, said at least one sensor or both, and such that said offline event is performed automatically.

2. The system of claim 1, wherein said device is registered at the server, such that the server accepts the trigger only if said device is registered.

3. The system of claim 2, wherein said user computational device comprises a second processor and a second memory, wherein said second memory stores a plurality of instructions for operating the user interface, controlling the offline event, updating the parameter at the server and receiving the notification of the trigger.

4. The system of claim 2, wherein said limited function processor has limited input/output capabilities and limited communication ports.

5. The system of claim 4, wherein said limited function processor is a microcontroller or a FPGA (field programmable gate array).

6. The system of claim 1, wherein one or more instructions are received through said user interface for modifying activation of the trigger or the offline event.

7. The system of claim 6, wherein said modification occurs before activation of the trigger or after activation of the trigger.

8. The system of claim 1, wherein said device comprises hardware for authentication, wherein said trigger input is permitted only after authentication.

9. The system of claim 8, wherein said hardware for authentication is selected from the group consisting of biometric hardware and RFID (radio frequency identification) hardware.

10. The system of claim 1, wherein said server comprises a third processor and a third memory, wherein said third memory stores a plurality of instructions for executing said separate application and wherein said third processor executes said plurality of instructions.

11. The system of claim 1, further comprising a separate server comprising a computer network connection to the computer network, a fourth memory and a fourth processor, wherein said fourth memory stores a plurality of instructions for executing said separate application and wherein said fourth processor executes said plurality of instructions.

12. The system of claim 1, further comprising a client server assigned to the device, wherein said client server further comprises a broker for handling a message from the device for triggering the offline event and a routing service for routing the message from the broker to said client server; wherein upon routing the message to said client server, the user computational device is notified of the message and of the triggered offline event; wherein said client server comprises a fifth memory and a fifth processor, wherein instructions for executing said broker and said routing service are stored on said fifth memory for execution by said fifth processor.

13. The system of claim 12, wherein the device, the broker and the routing service communicate according to the MQTT protocol.

14. The system of claim 13, wherein the offline event comprises ordering a physical product through the device.

15. The system of claim 1, wherein said first memory is configured for storing a defined native instruction set of codes and wherein said first processor is configured to perform a defined set of basic operations in response to receiving a corresponding basic instruction selected from the defined native instruction set of codes stored in said first memory, wherein said first memory stores a first set of machine codes selected from the native instruction set for receiving an input from a manual activation of said at least one button; a second set of machine codes selected from the native instruction set for matching said input to a trigger according to one or more requirements; and a third set of machine codes selected from the native instruction set for invoking an event by said IoT device to said separate application.

16. The system of claim 1, wherein said first memory is configured for storing a defined native instruction set of codes and wherein said first processor is configured to perform a defined set of basic operations in response to receiving a corresponding basic instruction selected from the defined native instruction set of codes stored in said first memory, wherein said first memory stores a first set of machine codes selected from the native instruction set for receiving an input from said sensor; a second set of machine codes selected from the native instruction set for matching said input to a trigger according to one or more requirements; and a third set of machine codes selected from the native instruction set for invoking an event by said IoT device to said separate application.

17. The system of claim 1, wherein said second memory is configured for storing a defined native instruction set of codes and wherein said second processor is configured to perform a defined set of basic operations in response to receiving a corresponding basic instruction selected from the defined native instruction set of codes stored in said second memory, wherein said second memory stores a first set of machine codes selected from the native instruction set for registering the IoT device through said separate application; a second set of machine codes selected from the native instruction set for configuring said IoT device according to one or more requirements, wherein such requirements are sent from said separate application; and a third set of machine codes selected from the native instruction set for invoking an event by said IoT device through said application.

18. The system of claim 17, wherein said third memory is configured for storing a defined native instruction set of codes and wherein said third processor is configured to perform a defined set of basic operations in response to receiving a corresponding basic instruction selected from the defined native instruction set of codes stored in said third memory, wherein said third memory stores a first set of machine codes selected from the native instruction set for accessing said separate application and a second set of machine codes selected from the native instruction set for invoking one or more offline events.

19. A system for placing an order, comprising a computer network, a device for triggering placement of the order, wherein the device is controllable by a user, the device comprising a computer network connection to the computer network, a first processor and a first memory, wherein said first memory stores a plurality of instructions for triggering placement of the order and wherein said first processor executes said plurality of instructions; a server for receiving the trigger for placement of the order from the device through the computer network, wherein said device is registered at the server, such that the server accepts the trigger only if said device is registered; and a user computational device for receiving a notification of the trigger for placement of the order from the server, wherein the user computational device controls placement of the order and updates at least one parameter of the order at the server, the user computational device comprising a user interface for receiving instructions from the user and for displaying information from the server, and a computer network connection to the computer network; wherein said user computational device comprises a second processor and a second memory, wherein said second memory stores a plurality of instructions for operating the user interface, controlling placement of the order, updating the parameter at the server and receiving the notification of the trigger;

wherein said device for triggering placement of the order comprises an IoT device, wherein said IoT device comprises at least one button for receiving a trigger input, at least one sensor for receiving a trigger input, or both; wherein said at least one button, said at least one sensor or both comprises a direct input for directly triggering placement of the order; wherein said device comprises hardware for authentication and wherein said trigger input is permitted only after authentication; and wherein said second processor and said memory are contained in a MCU (microcontroller unit);

wherein one or more instructions are received through said user interface for modifying the trigger through said separate application;

wherein said separate application determines execution of said placement of the order that is triggered according to one or more rules, such that said execution is performed automatically upon being triggered by said at least one button, said at least one sensor or both, and such that said order is placed automatically.

* * * * *